US009363239B1

(12) United States Patent
Luman et al.

(10) Patent No.: US 9,363,239 B1
(45) Date of Patent: Jun. 7, 2016

(54) INTELLIGENT DELIVERABLE MESSAGE ANNOTATION

(75) Inventors: Kevin Lee Luman, Ashburn, VA (US); Jay Trevor McFarland, Ashburn, VA (US)

(73) Assignee: AOL Inc., Dulles, VA (US)

( * ) Notice: Subject to any disclaimer, the term of this patent is extended or adjusted under 35 U.S.C. 154(b) by 1179 days.

(21) Appl. No.: 11/952,424

(22) Filed: Dec. 7, 2007

Related U.S. Application Data

(60) Provisional application No. 60/917,603, filed on May 11, 2007.

(51) Int. Cl.
*G06F 15/16* (2006.01)
*H04L 29/06* (2006.01)

(52) U.S. Cl.
CPC .......... *H04L 63/0428* (2013.01); *H04L 63/105* (2013.01)

(58) Field of Classification Search
CPC . H04L 63/0428; H04L 63/105; G06Q 10/107
USPC ......................................................... 709/206
See application file for complete search history.

(56) References Cited

U.S. PATENT DOCUMENTS

| 5,862,325 | A  | * | 1/1999 | Reed et al. .................... 709/201 |
| 6,463,461 | B1 | * | 10/2002 | Hanson et al. ................. 709/204 |
| 7,930,629 | B2 | * | 4/2011 | Hurst-Hiller et al. ......... 715/234 |
| 2002/0112015 | A1 | * | 8/2002 | Haynes ............... H04L 63/0428 709/206 |
| 2003/0135555 | A1 | * | 7/2003 | Birrel et al. .................... 709/206 |
| 2004/0167963 | A1 | * | 8/2004 | Kulkarni ........................ 709/206 |
| 2004/0205653 | A1 | * | 10/2004 | Hadfield et al. ............... 715/530 |
| 2006/0224742 | A1 | * | 10/2006 | Shahbazi ................ H04L 63/20 709/226 |
| 2007/0156434 | A1 | * | 7/2007 | Martin et al. ..................... 705/1 |
| 2007/0162546 | A1 | * | 7/2007 | McLaughlin .................. 709/204 |
| 2007/0261099 | A1 | * | 11/2007 | Broussard ............. H04L 63/102 726/1 |
| 2008/0016164 | A1 | * | 1/2008 | Chandra ........................ 709/206 |
| 2008/0040126 | A1 | * | 2/2008 | Estrada et al. ..................... 705/1 |
| 2008/0091785 | A1 | * | 4/2008 | Pulfer et al. ................... 709/206 |
| 2008/0109881 | A1 | * | 5/2008 | Dasdan ............................. 726/4 |

OTHER PUBLICATIONS

Ghamrawi, Nadia, et al., "Collective Multi-Label Classification", http://caloproject.sri.com/darpa/, 9 pages total.
"del.icio.us: social bookmarking", http://del.icio.us/ and http://del.icio.us/help/tags, 6 pages total.

\* cited by examiner

*Primary Examiner* — Arvin Eskandarnia
(74) *Attorney, Agent, or Firm* — Finnegan, Henderson, Farabow, Garrett & Dunner, LLP

(57) ABSTRACT

Enabling recipients to share tags that they associate with received e-mails includes receiving an e-mail from a sending user addressed to a receiving user, the e-mail including a header and a body and being capable of supporting attachments to the e-mail that are distinct of the body. The receiving user is enabled to perceive the e-mail and associate at least one tag with the e-mail, the at least one tag being a textual descriptor for the received e-mail distinct from the header, body, and attachments of the received e-mail. The received e-mail and the at least one tag are stored in a data store associated with the receiving user. The at least one tag is propagated to at least one of the sending user and another recipient of the e-mail to whom the sender sent the e-mail.

25 Claims, 16 Drawing Sheets

INTELLIGENT DELIVERABLE MESSAGE ANNOTATION

CROSS REFERENCE TO RELATED APPLICATION

This application claims priority from U.S. Provisional Application No. 60/917,603 filed May 11, 2007, and titled INTELLIGENT DELIVERABLE MESSAGE ANNOTATION, which is incorporated by reference.

TECHNICAL FIELD

This description relates to electronic messaging systems.

BACKGROUND

Network systems enable communication of messages between users. For example, an electronic mail system (or a compatible system) enables the communication of e-mail messages between users, and a voicemail system (or a compatible system) enables the communication of voicemail messages between users. Likewise, an integrated voicemail and e-mail system enables the communication of both voicemail and e-mail messages between users through a common user interface. Messages received by users may be saved by the users for later retrieval and may be organized by the users into different groups or folders to facilitate subsequent retrieval of the saved messages by the user.

SUMMARY

In one general aspect, enabling recipients to share tags that they associate with received e-mails includes receiving an e-mail from a sending user addressed to a receiving user, the e-mail including a header and a body and being capable of supporting attachments to the e-mail that are distinct of the body. The receiving user is enabled to perceive the e-mail and associate at least one tag with the e-mail, the at least one tag being a textual descriptor for the received e-mail distinct from the header, body, and attachments of the received e-mail. The received e-mail and the at least one tag are stored in a data store associated with the receiving user. The at least one tag is propagated to at least one of the sending user and mother recipient of the e-mail to whom the sender sent the e-mail.

Implementations may include one or more of the following features. For example, the receiving user may be enabled to associate the at least one tag with the e-mail by enabling the receiving user to assign the at least one tag to the e-mail for subsequent use as a basis for determining, in response to a search query submitted by the receiving user, a subset of stored e-mails that are addressed to the receiving user. Propagating the at least one tag to the at least one of the sending user and the other recipient may include sending the at least one tag to the at least one of the sending user and the other recipient as a proposed tag such that the at least one of the sending user and the other recipient can select to assign the proposed tag to the e-mail for subsequent use as a basis for determining, in response to a search query submitted by the at least one of the sending user and the other recipient, a subset of stored e-mails that are sent by or addressed to the at least one of the sending user and the other recipient.

Propagating the at least one tag to at least one of the sending user and another recipient of the e-mail may include automatically sending the at least one tag as a proposed tag for the e-mail to at least one of the sending user and the other recipient in accordance with predetermined send tag rules. The predetermined send tag rules may be specific to the receiving user.

Automatically sending the at least one tag as a proposed tag for the e-mail in accordance with the send tag rules may include automatically sending the at least one tag to the sending user and to all other recipients of the e-mail to whom the sender sent the e-mail. Automatically sending the at least one tag as a proposed tag for the e-mail in accordance with the send tag rules may include automatically sending the at least one tag to one or more users selected by the receiving user, the one or more users including at least one of the sending user and the other recipient. Automatically sending the at least one tag as a proposed tag in accordance with the send tag rules may include automatically sending the at least one tag conditioned on the at least one tag being a new tag created by the receiving user for the e-mail. Automatically sending the at least one tag as a proposed tag in accordance with the send tag rules may include automatically sending the at least one tag conditioned on the at least one tag being an update of an old tag previously received from and created by the sending user or the other recipient for the e-mail.

Automatically sending the at least one tag as a proposed tag in accordance with the send tag rules may include automatically sending the at least one tag to at least one of the sending user and the other recipient conditioned on a subject matter of the e-mail in the header matching a particular subject matter. The particular subject matter may be selected by the receiving user.

Automatically sending the at least one tag as a proposed tag in accordance with the send tag rules may include automatically sending the at least one tag to at least one of the sending user and the other recipient conditioned on the body of the e-mail including one or more terms that match one or more particular predetermined terms. The one or more particular predetermined terms may be selected by the receiving user.

Propagating the at least one tag to at least one of the sending user and the other recipient of the e-mail may include enabling the receiving user to interact with a graphical user interface to manually select the at least one of the sending user and the other recipient to receive the at least one tag as a proposed tag for the e-mail. Enabling the receiving user to associate the at least one tag with the e-mail may include automatically generating and assigning the at least one tag to the e-mail based on predetermined tag generation rules specified by or for the receiving user.

Generating and assigning the at least one tag to the e-mail based on the tag generation rules may include generating and assigning a particular tag to the e-mail conditioned on the sending user being a particular sender. Generating and assigning the at least one tag to the e-mail based on the tag generation rules may include generating and assigning a particular tag to the e-mail conditioned on one of the recipients of the e-mail to whom the sending user sent the e-mail being a particular recipient. Generating and assigning the at least one tag to the e-mail based on the tag generation rules may include generating and assigning a particular updated tag corresponding to an update of a particular proposed tag to the e-mail conditioned on the sending user or the other recipient sending the particular proposed tag to the receiving user.

Generating and assigning the at least one tag to the e-mail based on the tag generation rules may include generating and assigning a particular tag to the e-mail conditioned on a subject matter of the e-mail in the header matching a particular subject matter. The particular subject matter may be selected by the receiving user.

In another general aspect, enabling a user to identify and then access a subset of received e-mails includes receiving an e-mail from a sending user addressed to a receiving user, the e-mail including a header having a subject line inputted by the sending user and a body having message contents inputted by the sending user, the e-mail being capable of supporting attachments to the e-mail that are distinct of the body. Subsequent to receiving the e-mail from the sending user, a proposed tag associated with the e-mail is received from an other user, the proposed tag being designated by the other user and being a textual descriptor of the message contents of the e-mail and the textual descriptor also being distinct of the subject line, message contents, and attachments of the e-mail. The proposed tag is stored and assigned to the e-mail for subsequent use as a basis for identifying, in response to a search query submitted by the receiving user, a subset of stored e-mails that are addressed to the receiving user.

Implementations may include one or more of the following features. For example, assigning the proposed tag to the e-mail may include enabling the receiving user to perceive the proposed tag in a graphical user interface and to manually interact with the graphical user interface to select an option to assign the proposed tag to the e-mail. Assigning the proposed tag to the e-mail may include automatically assigning the proposed tag to the e-mail based on predetermined tag acceptance rules. The predetermined tag acceptance rules may be specific to the receiving user.

In another general aspect, enabling a user to access e-mails includes receiving e-mails from e-mail senders, each of the e-mails being addressed to a receiving user, including a header and a body, and being capable of supporting attachments to the e-mail that are distinct of the body. The receiving user is enabled to perceive the e-mails and to associate at least one tag with each of the e-mails, the at least one tag being a textual descriptor for the e-mail that is distinct of the header, the body, and the attachments of the e-mail. The e-mails and associated tags are stored in a data store. The receiving user is enabled to input a textual boolean search query. A subset of the e-mails is determined by applying the textual boolean search query to the tags associated with the e-mails, and the receiving user is enabled to perceive the subset of the e-mails.

DETAILED DESCRIPTION

Figure 1:
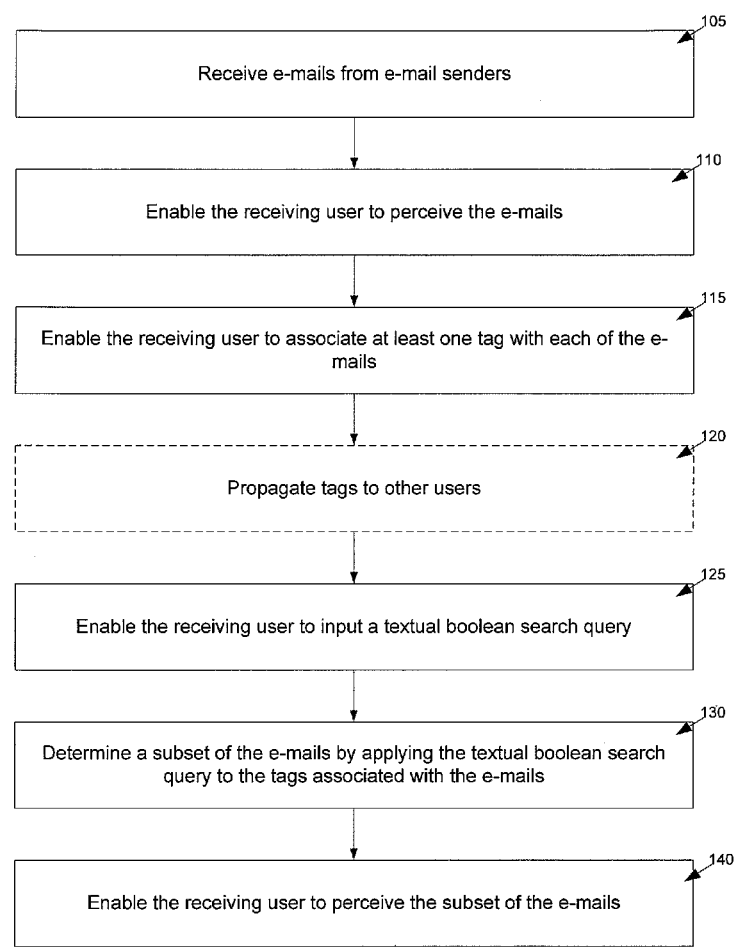
FIG. 1 is a flow chart illustrating a process for enabling a user to intelligently tag received e-mails and subsequently search the tags to find e-mails of interest.

In one implementation, a modified e-mail system enables a user to annotate or tag e-mails saved by the user to facilitate subsequent access to the e-mails by the user. In particular, after a user associates tags with e-mails (i.e., tags the e-mails or assigns tags to the e-mails), the user is able to leverage the tags to enable the user to quickly search for particular tagged e-mails by inputting a tag search query and to quickly navigate through stored e-mails by interacting with an interface that displays e-mails as groups organized based on their associated tags. A tag is typically a textual descriptor or note for an e-mail that is distinct from the header (which typically includes a sender address, at least one recipient address, a subject, and a date and time), the body (which includes the message contents of the e-mail), and the attachments of the e-mail. A tag associated with an e-mail may be, for example, "Milestone 3", which may indicate that the contents of the e-mail relate to the third milestone of a project. A user may assign one or more tags to an e-mail as part of composing the e-mail for delivery to recipients and as part of opening and viewing a previously received or stored e-mail.

When a user opens or accesses an e-mail received from a sender, the user is presented with an interface that displays the contents of the e-mail and any tags proposed for assignment to the e-mail that were created by the e-mail sender (i.e., sender tags) or by other recipients (i.e., other recipient tags) of the e-mail. The proposed sender tags and other recipient tags are typically tags assigned to the e-mail by the sender and other recipients, respectively. By assigning the sender and/or other recipient tags to the e-mail, the user is not only able to quickly tag the e-mail without being forced to manually create a new tag but, importantly, is also able to coordinate his e-mail organization scheme with that of the sender and/or other recipients.

The user is also able to interact with the interface to assign new tags of his own creation to the e-mail and to assign updated tags to the e-mail that are updates of the proposed sender tags and other recipient tags. If the user assigns new tags of his own creation to the e-mail and/or assigns updated tags that are updates of the proposed sender tags and/or other recipient tags, the user may be presented with the option to send or propagate the new and/or updated tags to the sender and/or the other recipients as proposed new tags and/or tag updates. The sender and/or other recipients may then be presented with an interface that allows them to accept the proposed new tags and/or tag updates for assignment to the opened e-mail and/or to other e-mails.

The assignment of tags to an e-mail may be done manually by the user or automatically in accordance with global and/or user-specific predetermined rules specified by or for the user.

The predetermined rules may include: (1) tag generation rules that automatically generate and assign new tags and/or generate and assign updated tags to an e-mail; (2) tag acceptance rules that automatically assign (or do not assign) tags proposed by the sender and/or by other recipients to an e-mail that has not already been opened or accessed by the user; (3) send tags rules that automatically send (or do not send) new and/or updated tags as proposed tags to the sender and/or other recipients of an e-mail; and (4) tag update rules that automatically accept (or reject) or recommend acceptance (or rejection) of assignment of proposed new and/or updated tags received from other users for an e-mail that has already been opened or accessed by the user.

A user may search for tagged e-mails by inputting a tag search query into a search interface. The tag search query may be a textual Boolean keyword search query such as, for example, "Milestone 3 or Jim", which corresponds to a user request for e-mails that have been assigned the tag "Milestone 3" and/or the tag "Jim". In some implementations, the tag search query may be used to search for e-mails based on tags that were assigned to the e-mails and/or tags that were proposed but not assigned to the e-mail. The tag search query also may search for e-mails based only on sender tags, recipient tags (i.e., new or updated tags created by the user), and/or other recipient tags.

FIG. 1 illustrates an example of a process 100 for enabling a user to intelligently annotate or tag received e-mails and subsequently search the tags of the received e-mails to find e-mails of interest. The operations in flow chart 100 are described generally as being performed by a processor. In some implementations, the processor may be included in an electronic device or system configured to send and receive communications over a network. For example, the processor may be included in an electronic device or system of a host, a content provider, a service provider, or a user. In another example, the operations in flow chart 100 may be performed by multiple processors included in one or more electronic devices or systems. Moreover, while the process 100 is described as being applied to e-mails, the same process may be applied to any electronic messages that are sent by users to recipient users to communicate with the recipient users and that are capable of being stored by the recipient users for subsequent access. For example, the process 100 may be applied to voicemails in addition to or as an alternative to e-mails.

The processor receives e-mails from e-mail senders and stores the e-mails in a data store (105). For example, the processor may receive, over a network, e-mails from electronic devices associated with sending users. The e-mail senders may send the e-mails by interacting with an e-mail communications application program accessible through a sending electronic device. In another implementation, the e-mail senders may send both e-mails and voicemails by interacting with a unified communications application program accessible through the sending electronic device.

Figure 2A:
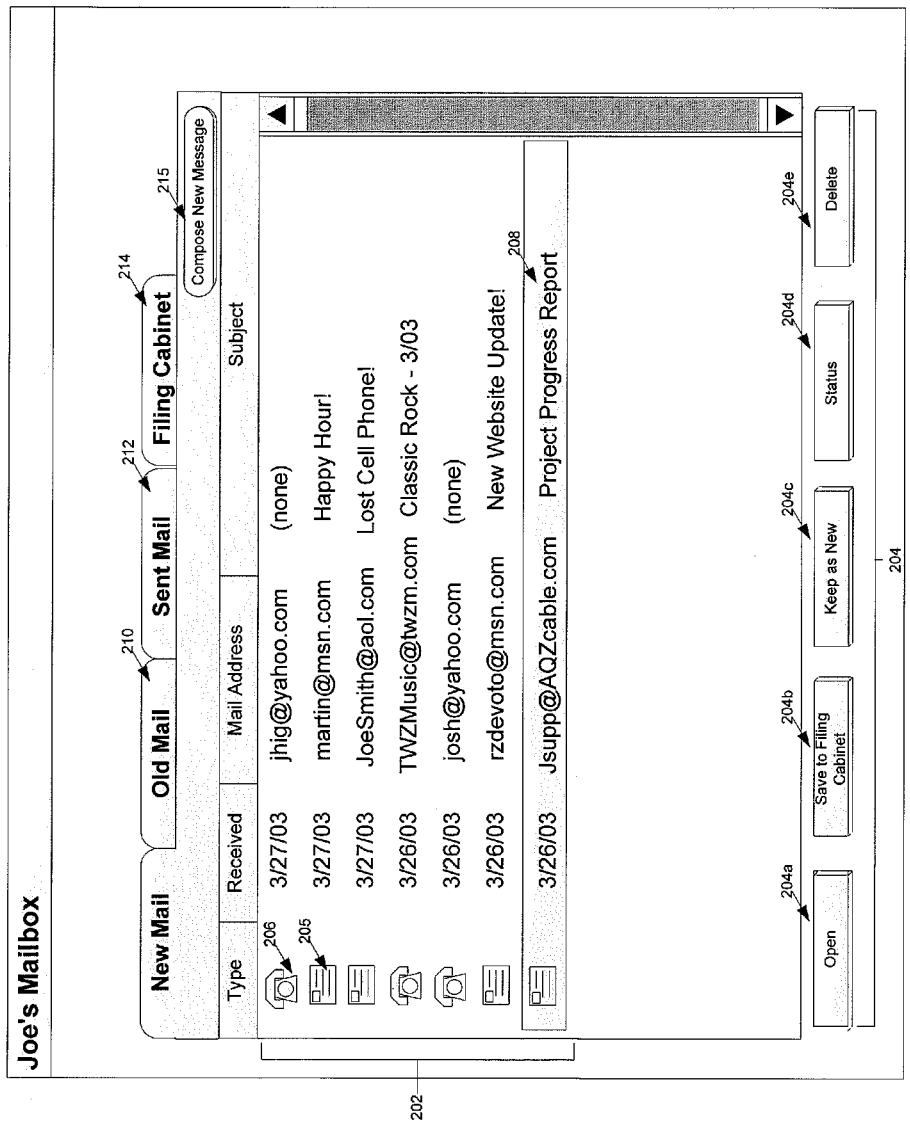
FIG. 2A is a diagram of an exemplary mail system user interface.

The processor enables the receiving user to perceive the e-mails (110). In one implementation, the processor may enable a recipient electronic device to visually present a list of header information corresponding to the received e-mails to a user in a graphical user interface. The user may interact with the user interface to select header information corresponding to a received e-mail to thereby perceive the message content of the received e-mail. An example of such a user interface is shown in FIG. 2A, which is described in further detail below.

Figure 2B:
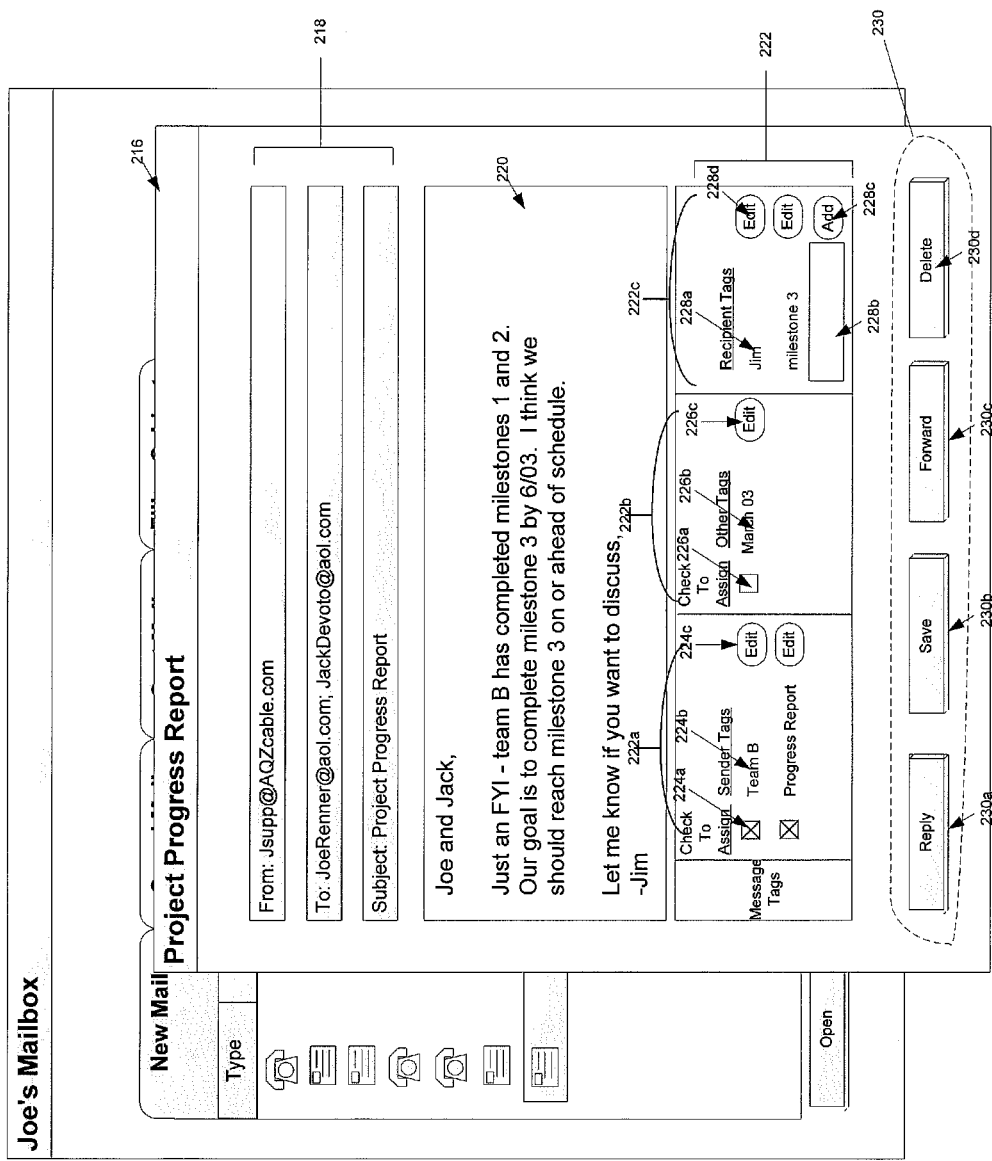
FIG. 2B is a diagram of an exemplary individual mail interface.

The processor enables the receiving user to associate at least one tag with each of the received e-mails (115). In some implementations, the user may interact with another graphical user interface to both view the message content of the particular selected e-mail and to assign tags to the selected e-mail. An example of such a user interface is shown in FIG. 2B, which is described in further detail below. In another implementation, predetermined tag generation rules and tag acceptance rules automatically associate tags with each of the received e-mails without need for user interaction. Examples of predetermined tag generation and acceptance rules are also described in further detail below. Notably, the user may assign tags to the e-mail that were proposed by and correspond to tags assigned to that e-mail by the sender of the e-mail or by other recipients of the e-mail.

Once the user has assigned tags to the e-mail, the processor may optionally propagate the tags to other users (120). In one implementation, the processor may give the user the option to send any tags assigned to the e-mail that were newly created by the user or newly updated by the user to the sender of the e-mail and/or to the other recipients of the e-mail. The sender and/or other recipients of the e-mail may then view the new/updated tags and determine whether or not to accept the new/updated tags. The user may send the new/updated tags to other users by interacting with a graphical user interface such as, for example, the send tags interface 240 shown in FIG. 2C, which is described in further detail below.

The processor enables the receiving user to input a search query, such as, for example, a textual Boolean search query (125). An exemplary search query may be "milestone 3 & Team B", which corresponds to a search for mail that has been assigned both the tag "milestone 3" and the tag "Team B." The user may input the search query through interaction with another graphical user interface such as, for example, the mail system interface 300 shown in FIG. 3A, which is described in further detail below.

The processor receives the search query and determines a subset of the received e-mails by applying the search query to the tags associated with the received e-mails (130). The processing may be done using, for example, similarity and keyword search algorithms wherein e-mails having tags that are similar to the terms included in the search query or that otherwise satisfy the search query are selected for inclusion in the subset of e-mails.

The processor enables the receiving user to perceive the subset of e-mails having tags that are deemed by the processor to satisfy the search query (140). The subset of e-mails may be presented to the user in a graphical user interface such as, for example, the mail system interface 350 shown in FIG. 3B, which is described in further detail below.

FIG. 2A shows an exemplary mail system user interface 200 that may be used by a recipient to perceive e-mails and voicemails using a recipient electronic device. The mail system user interface 200 may be used to select an e-mail or voicemail, and to display a corresponding individual mail interface, such as, for example, interface 216 shown in FIG. 2B. The receiving user may interact with the individual mail interface 216 to assign tags to a received e-mail or voicemail. The interfaces 200 and 216 may be implemented using, for example, a client software module on a recipient electronic device or using a server software module in a server or host system. In some implementations, the interfaces 200 and 216 may be perceivable by a user through a web browser interface. In some implementations, interfaces 200 and 216 may be combined into a single interface that enables control of both system-level mail operations and individual mail operations.

Referring to FIG. 2A, an exemplary mail system user interface 200 includes a list 202 of mail entries containing selected portions of the header of mail recently received (i.e., new mail) and mail operation buttons 204. The type of mail represented by a given entry may be depicted by a label that may be text or that may be a graphical element (e.g., an icon). In the implementation shown, a letter icon 205 represents an e-mail and a phone icon 206 represents a voicemail.

A user may select to compose a new mail by selecting graphical element 215. Selection of graphical element 215 may result in a new interface being presented to the user that allows the user to compose message text (or input message audio) for the new mail, assign tags to the new mail, address the new mail to specified recipients, and initiate delivery of the new mail to the specified recipients. An example of such a user interface is shown in FIG. 2E, which is described in further detail below.

Instead of composing a new mail for delivery, a user may instead perform various mail operations on a recently received mail of interest by selecting a mail entry corresponding to the mail of interest from the list 202. For example, a user may select an exemplary mail entry 208 in the list 202 using an input mechanism available to the user, such as a keyboard or a mouse. A selected mail entry may be denoted as being selected by, for example, being highlighted.

Once a mail entry has been selected, the user may perform mail operations including, but not limited to: (1) opening the selected mail, (2) placing the mail in a selected folder or filing cabinet, (3) keeping the mail as new, (4) checking the status of the mail, and (5) deleting the selected mail. The user may perform these operations on the selected mail by, for example, selecting one or more graphical elements displayed in the user interface 200, such as, for example, the open button 204a, the save button 204b, the keep as new button 204c, the status button 204d, and the delete button 204e. Alternatively, the user may employ keyboard function keys, pop-up menus, and/or mouse button inputs to perform one or more of these operations. The desired operations may be implemented, for example, through the use of hyperlinks that grant access to specified directories embedded in the online service provider's network and/or through the triggering of macros or other pre-programmed algorithms.

The user interface 200 also may allow the user to access other lists similar to list 202 but containing mail entries that satisfy different criteria. For example, the user interface 200 may include an old mail tab (or folder) 210, a sent mail tab (or folder) 212, and a filing cabinet or saved mail tab (or folder) 214. The old mail tab 210 and the sent mail tab 212 may be selected by a user to access lists comparable to list 202 but containing entries corresponding to old mail (i.e., read mail) and/or sent mail (i.e., mail sent by the user), respectively. The filing cabinet or saved mail tab 214 may be selected by a user to access a list comparable to list 202 but containing entries corresponding to saved mail. In other implementations, the old mail, the sent mail, the saved mail, and the other lists may be accessed through selection of other graphical elements (e.g., buttons) displayed in the user interface 200 and/or through the use of keyboard function keys, pop-up menus, and/or mouse button inputs. In some implementations, additional tabs included in the interface 200 may be selected by a user to access, for example, only voicemails, only e-mails, or to access e-mails and/or voicemails.

Figure 12:
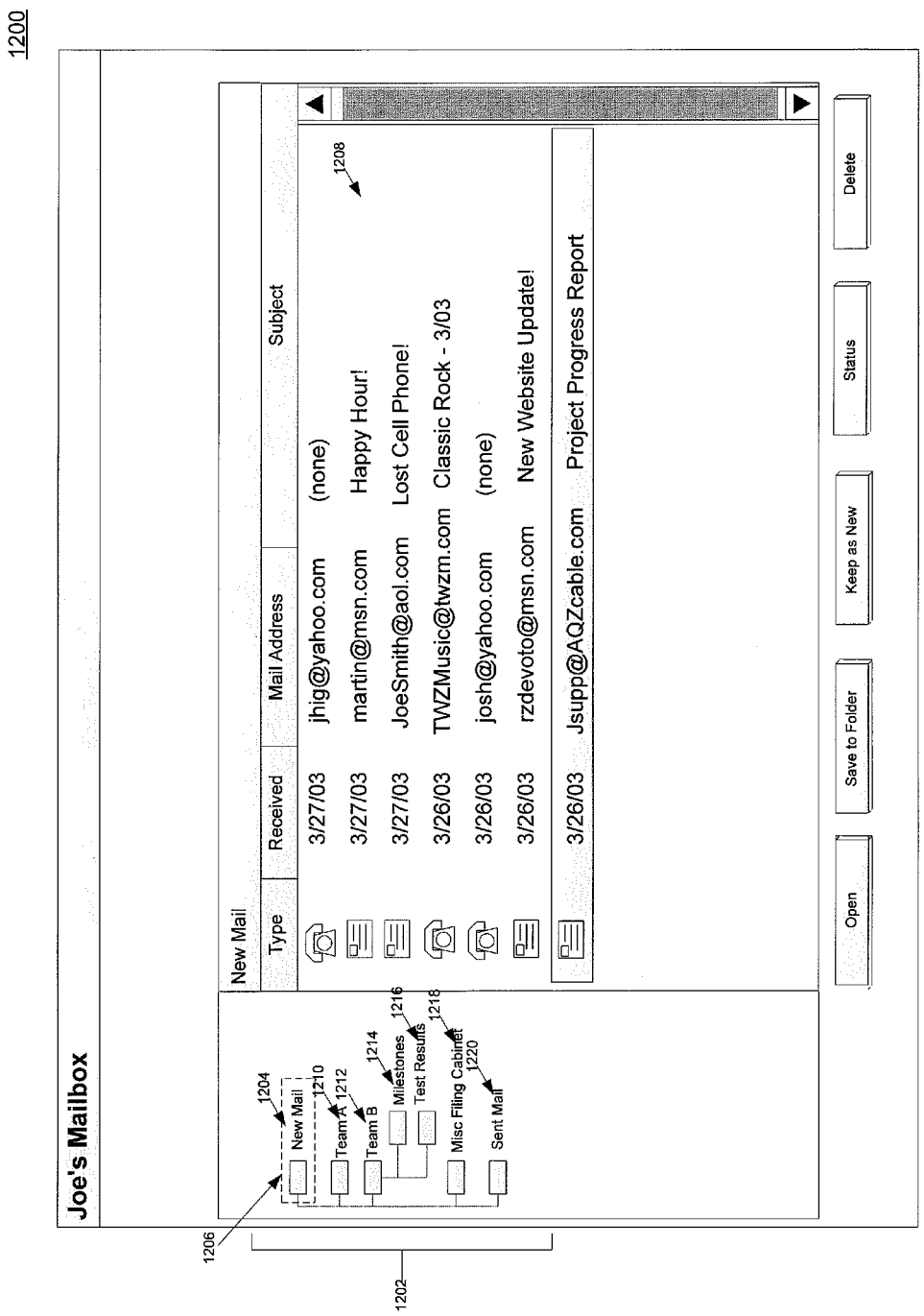
FIG. 12 is a diagram illustrating an exemplary mail system user interface.

In some implementations, the new mail tab, the old mail tab 210, the sent mail tab 212, the filing cabinet tab 214, and other tabs are displayed as folders positioned in a graphical folder hierarchy, rather than as tabs. The user may select a folder in the folder hierarchy to display the list of mail entries corresponding to the selected folder. An example of such an interface is shown in FIG. 12, which is described in further detail below.

In some implementations, new folders/tabs are shown and accessible via the interface 200 that include only piece of mail that have tags that satisfy particular criteria. This implementation is described in more detail below with respect to FIG. 12. In some implementations, interface 200 includes an additional column (e.g., titled "Tags") that displays assigned/proposed tags for each of the mail entries in the list 202. The user may select or click on the column title to organize and/or sort (e.g., alphabetically) the mail based on the assigned and/or proposed tags.

Referring to FIG. 2B, when the user selects a mail entry corresponding to a piece of mail from the list 202 and selects the open button 204a or performs a similar operation to open the mail, the individual mail interface 216 is presented to the user. The individual mail interface 216 includes a display 218 of all or selected portions of the header section of the mail, a display 220 of the message text of the mail, a tag assignment interface 222 for assigning tags to the message, and graphical elements or buttons 230 that enable performance of mail operations related to the selected mail.

In the illustrated example, the display 218 includes header information that indicates that the sender of the e-mail is "Jsupp@AQZcable.com", the recipients of the e-mail are "JoeRenner@aol.com" (who is the user that is currently receiving the interface 216) and "JackDevoto@aol.com". The subject of the e-mail is "Project Progress Report." Other header information also may be displayed by display 218 including, for example, the time and day that the e-mail was sent by Jsupp@AQZcable.com.

In the illustrated example, the display 220 includes a text message from Jim sent to Joe and Jack that provides Joe and Jack with an update of the progress of Team B on a project. If the opened mail had been a voicemail rather than an e-mail, the display 220 may contain an embedded link that may be selected by the user to play the contents of an attached audio file. The attached audio file may be streamed from a remote storage location to the user to allow playback to commence quickly and/or may be downloaded as a file and subsequently played back once the complete file is stored in the recipient electronic device. In some implementations, the display 220 also may contain the time at which the voicemail was deposited and, if applicable, caller related information (e.g., caller telephone number, time called, and date called).

The tag assignment interface 222 is a user interface with which the recipient of the mail may interact to assign tags to the displayed mail. In the displayed exemplary implementation, the tag assignment interface 222 includes a sender tag assignment section 222a, an other tag assignment section 222b, and a recipient tag assignment section 222c.

The sender tag assignment section 222a includes a list of entries that display the tags, if any, that the sender of the mail proposes should be assigned to the mail (which typically correspond to the tags that the sender chose to assign to his/her copy of the mail). An exemplary entry may include a check box 224a, a sender tag 224b, and a graphical element 224c (e.g., a graphical button). The recipient of the e-mail may select (i.e., "check") the check box 224a to assign the sender tag 224b to the displayed mail. The recipient also may select the graphical element 224c to edit the sender tag. If the recipient edits the sender tag 224b, the unedited version of the tag 224b may remain in the sender tag assignment section 222a with no check in the check box 224a and the edited version of tag 224b may automatically be placed as a new recipient tag in the recipient tag assignment section 222c. In some implementations, the sender tag assignment section 222a may include an indicator identifying which tags were updated by the recipient. In the illustrated example, the sender Jsupp@AQZcable.com proposes that the displayed e-mail be assigned the tags "Team B" and "Progress Report". The recipient JoeRenner@aol.com checked the corresponding check boxes 224a, thereby accepting the assignment of these tags to the displayed e-mail.

The other tag assignment section 222b includes a list of entries that display the tags, if any, that other recipients of the mail propose should be assigned to the mail (which typically correspond to the tags that the other recipients chose to assign to their copy of the mail). An exemplary entry may include a check box 226a, an other recipient tag 226b, and a graphical element 226c (e.g., a graphical button). The recipient of the e-mail may select the check box 226a to assign the other recipient tag 226b to the displayed mail. The recipient also may select the graphical element 226c to edit the other recipient tag 226b. If the recipient edits the other recipient tag 226b, the unedited version of the tag 226b may remain in the other tag assignment section 222b with no check in the check box 226a and the edited version of tag 226b may automatically be placed as a new recipient tag in the recipient tag assignment section 222c. In some implementations, the other tag assignment section 222b may include an indicator identifying which tags were updated by the recipient. In some implementations, if the recipient updates a tag in the e-mail, the recipient is prompted whether he or she wishes to update the tag for all e-mails that have been assigned that tag. In some implementations, the other tag assignment section 222b includes user identifiers that identify the other recipients that proposed the corresponding tags 226b. In the illustrated example, the other recipient JackDevoto@aol.com proposes that the displayed e-mail be assigned the tag "March 03". The recipient JoeRenner@aol.com did not check the corresponding check box 226a, thereby not accepting the assignment of this tag to the displayed e-mail.

The recipient tag assignment section 222c includes a list of entries that display new tags assigned to the mail by the recipient. The recipient is able to add new tags 228a to be assigned to the mail by inputting the new tag into the dialog box 228b (e.g., by typing in the tag using a keyboard or other input device) and selecting the graphical element 228c (e.g., a graphical button). In some implementations, the user is able to add a new tag 228a by selecting from among multiple prestored tags previously inputted by the user or by other users (e.g., the sender of the mail or other recipients of the mail). In the illustrated example, the recipient JoeRenner@aol.com has assigned the tags "Jim" and "Milestone 3" to the e-mail. In some implementations, the list of new tags 228a also my include an indicator that identifies the tag as an updated tag or an entirely new tag. The user may select to edit any of the assigned tags by selecting, for example, a button 228d.

The above tag assignment interface 222 is merely one implementation of an interface that allows a user to assign tags to mail. Other mechanisms and techniques for enabling mail tag assignment are possible. For example, the user may assign tags to the e-mail through the use of a graphical user interface having other controls, such as drop down menus, toolbars, pop-up dialog boxes, and pop-up menus, and having other configurations, such as different sections or groupings, that enable assignment of tags to one or more e-mails sequentially or concurrently.

Graphical elements or buttons 230 enable performance of mail operations related to the selected mail. The user typically selects one of the graphical elements or buttons 230 to dispose of the displayed mail and to finalize the assignment of the tags to the displayed mail. In the illustrated implementation, the buttons 230 of the individual mail interface 216 include (1) a button 230a selectable by the user to send an e-mail reply to the sender of the mail, (2) a button 230b selectable by the user to save the e-mail in a file cabinet or folder; (3) a button 230c selectable by the user to forward the mail, and (4) a button 230d selectable by the user to delete the mail. The desired operations may be implemented, for example, through the use of hyperlinks that grant access to specified directories embedded in the online service provider's network and/or through the triggering of macros or other pre-programmed algorithms.

Figure 5A:
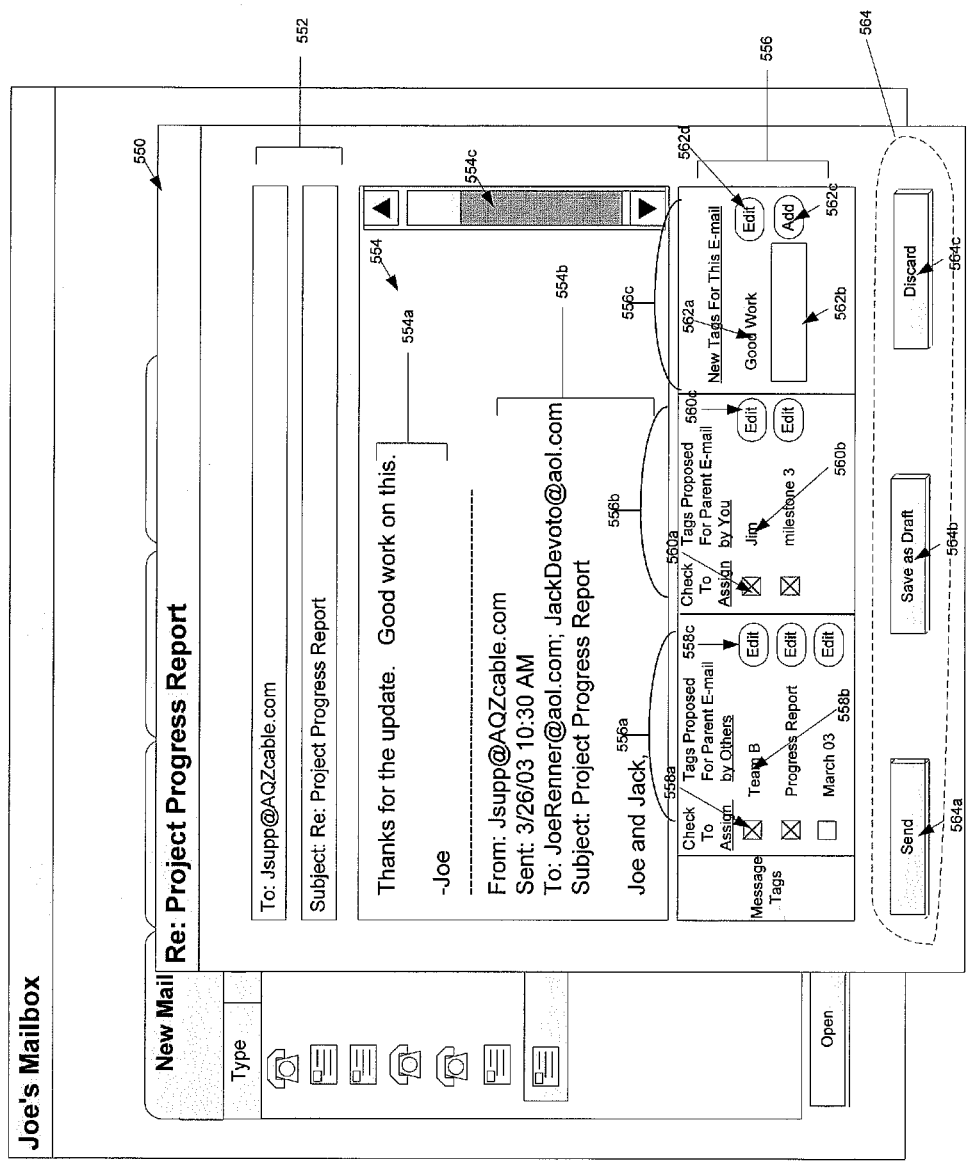
FIGS. 5A and 5B are diagrams illustrating exemplary user interfaces that enable a user to compose a mail, assign tags to the mail, and initiate delivery of the mail to one or more other users.

If the user selects the button 230a, the user may be presented with a new interface with which the user may interact to send a reply to the sender of the mail. FIG. 5A, described in further detail below, illustrates an example of such an interface. Selection of button 230a also disposes of the mail displayed in interface 216 by storing the mail as "old mail." The stored mail may be accessed by the user through selection of the old mail tab 210 of interface 200 and/or through a tag search as described in further detail below with respect to FIG. 3A. Storing the mail also stores the assigned tag data for the mail in accordance with the selected tags displayed in the tag assignment interface 222.

The user may select the button 230b to dispose of the mail by saving the mail in a file cabinet or in a particular folder. The stored e-mail may be accessed by the user through selection of the file cabinet tab 214 of interface 200, through selection of the particular folder in a user interface displaying a folder hierarchy, and/or through a tag search as described in further detail below with respect to FIG. 3A. Storing the mail also stores the assigned tag data for the mail in accordance with the selected tags displayed in the tag assignment interface 222.

If the user selects the button 230c, the user may be presented with a new interface with which the user may interact to forward the mail to other users. The new interface may be, for example, similar to the user interface shown in FIG. 5A but may be addressed to other users rather than to the sender. Selection of button 230c also disposes of the mail displayed in interface 216 by storing the mail as "old mail" The stored mail may be accessed by the user through selection of the old mail tab 210 of interface 200 and/or through a tag search as described in further detail below with respect to FIG. 3A. Storing the mail also stores the assigned tag data for the mail in accordance with the selected tags displayed in the tag assignment interface 222.

The user may select the button 230d to delete the mail. In some implementations, deleting the mail disposes of the mail by immediately deleting both the mail and the tag data associated with the mail. In other implementations, deleting the mail stores the mail as "deleted mail" that may be subsequently accessed by the user via a deleted mail folder or tab and/or through a tag search as described in further detail below with respect to FIG. 3A. In this implementation, deleting the mail stores the mail and the tag data for subsequent retrieval by the user. The ability of the user to retrieve deleted mail, however, is typically limited to a predetermined window of time subsequent to the deletion of the mail (e.g., two days).

If the user has assigned updated or new tags to a piece of mail and then disposed of the mail through, for example, selection of one of the buttons or graphical elements 230, the user may be subsequently presented with a send tags user interface. The user may interact with the send tags user interface to choose which updated or new tags the user wishes to send to the sender of the mail and/or to other recipients of the mail as proposed tags for the mail. An example of a send tags user interface is interface 240 shown in FIG. 2C, which is described in further detail below.

If the user accesses another folder/tab, such as the old mail folder/tab 210, sent mail folder/tab 212 or the filing cabinet tab/folder 214 and opens a selected piece of mail that has already been assigned tags, the user may be presented with an interface similar to interface 216 except that the tag assignment interface 222 may already be populated with checkmarks in the corresponding checkboxes for each of the tags previously assigned by the user in the respective categories (i.e., assigned tags that were proposed by sender, assigned tags that were proposed by other recipients, and assigned tags that the user added). The user may select buttons 224c, 226c and 228d to edit any of the already assigned tags and may select a graphical element or button 228c to add a new tag to the mail. The user also may choose to no longer assign one or more of the tags to the e-mail by unchecking the corresponding checkboxes. In some implementations, the interface for an individual piece of mail that has already been opened and assigned tags only shows the assigned tags in the interface. In other implementations, the interface for an individual piece of mail that has already been opened and assigned tags shows, in addition to the assigned tags, all or a subset of the tags that were previously proposed for the e-mail but not assigned with corresponding checkboxes unchecked. If the user adds or edits any of the assigned tags, the user may be prompted, through a send tags user interface, to choose whether the user wishes to send the updated and/or new tags as proposed updated or new tags to the sender and/or to one or more of the other recipients.

In some implementations, a mail is automatically assigned tags without requiring manual user assignment by applying tag generation rules and tag acceptance rules. Tag generation rules are rules that automatically generate and assign new and/or updated tags to the mail based on rules specified by or for the recipient. Tag acceptance rules are rules that automatically assign or do not assign proposed tags received from the sender and/or from the other recipients of the mail prior to the recipient accessing or opening the mail. The tag acceptance rules may be specified by or for the recipient. Notably, once a user has accessed or opened a mail, any new or updated proposed tags from the sender or from other recipients of the mail may be automatically assigned in accordance with tag update rules, which are described in detail below with respect to FIGS. 6 and 7. Tag generation, tag acceptance, and tag update rules may be predetermined global (i.e., rules applicable to all or to a group of subscribers of the mail service) and/or user-specific rules (i.e., rules specific to a particular recipient or user). User-specific tag generation, tag acceptance, and tag update rules may be stored for each user in a user profile.

Examples of global or user-specific tag generation rules include: (1) if the sender of the mail is a particular sender (e.g., Jsupp@AQZcable.com), then automatically generate and assign a particular tag (e.g., "Jim") to the mail; (2) if one of the recipients of the e-mail is a particular recipient (e.g., Sorpentor@123456.com), then automatically generate and assign a particular tag (e.g., "Personal") to the e-mail; (3) if the sender and/or another recipient of the mail proposed assignment of a particular tag (e.g., the tag "Team B") to the mail, then automatically generate and assign an updated tag to the e-mail (e.g., if the sender proposed the tag "Team B" then assign the updated tag "Team B-Ultrasound Project"); (4) if the subject matter (i.e., the contents of the subject field) of the mail matches a particular subject matter, then automatically generate and assign a particular tag to the e-mail; and (5) if the message contents of the e-mail include one or more terms that match particular predetermined terms (e.g., "quality" and "QA"), then automatically generate and assign a particular tag (e.g., the tag "Quality Assurance") to the e-mail. Tag generation may include selection of a predetermined or previously stored tag from among a group of predetermined or previously stored tags that were specified by or for the user.

Example of global or user-specific tag acceptance rules include: (1) if the proposed tag is a particular tag (e.g., "Team B"), then automatically accept (or reject) assignment of the tag; (2) if the proposed tag is from a particular sender (e.g., Jsupp@AQZcable.com), then automatically accept (or reject) assignment of the tag; (3) if the proposed tag is from a particular other recipient (e.g., JackDevoto@aol.com), then automatically accept (or reject) assignment of the tag; (4) automatically accept (or reject) assignment of all proposed tags from the sender of the mail; and (5) automatically accept (or reject) assignment of all proposed tags from other recipients of the mail.

If the user accesses a mail that has already been assigned tags based on the tag generation and acceptance rules, the tag assignment interface 222 is automatically populated, when first displayed to the user. In particular, the recipient tag assignment section 222c has new tags and checkboxes already checked in accordance with the generated and assigned tags. Similarly, the sender tag assignment section 222a and the other user tag assignment section 222b has checkboxes already checked to indicate the tags already assigned to the mail by the tag acceptance rules.

In another implementation, the tag assignment interface 222 merely displays tags that have been automatically assigned to the mail based on predetermined global and/or user-specific tag generation and acceptance rules in a list without regard to the source of the tags. In this implementation, the user may select to edit the list by selecting a single graphical user interface element (e.g., a graphical button). The user may edit the list by adding, deleting, or changing any of the tags in the list.

Figure 2C:
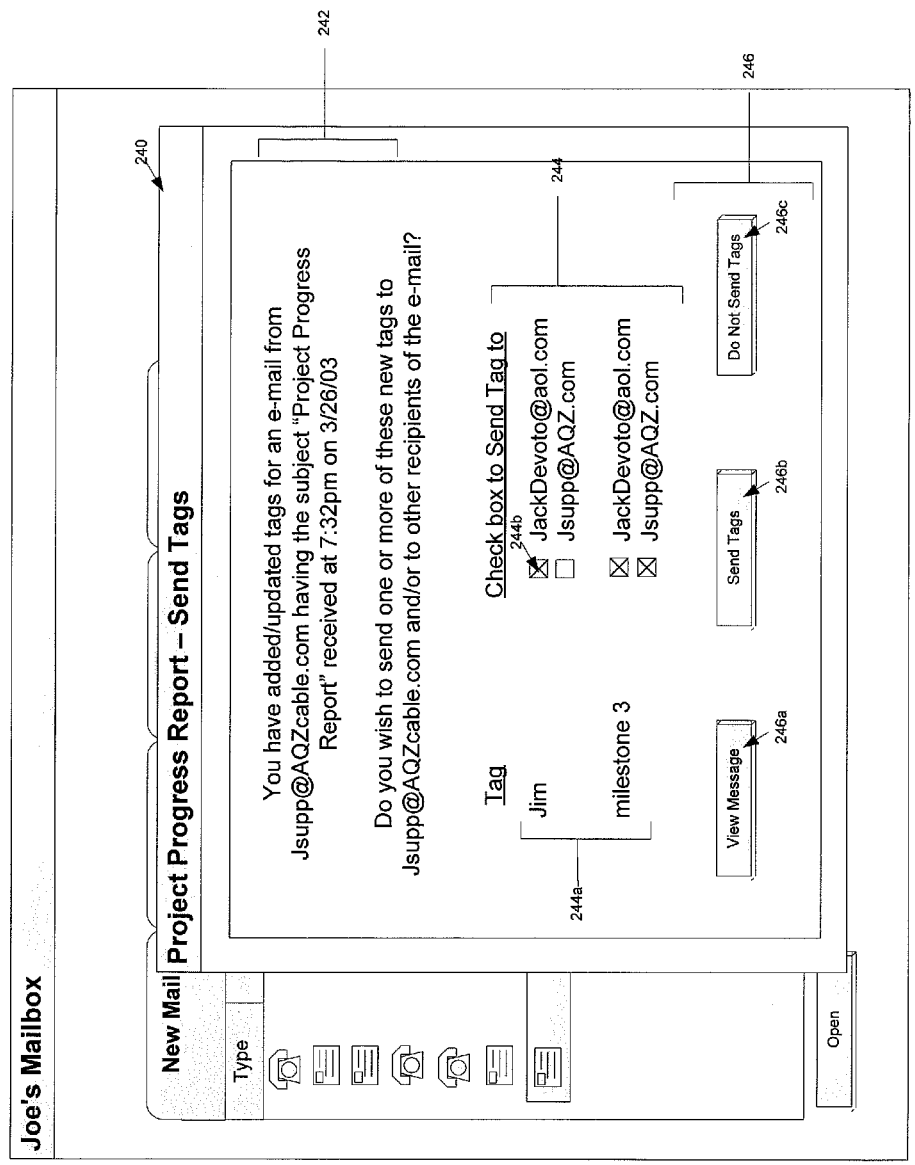
FIG. 2C is a diagram of an exemplary send tags user interface.

FIG. 2C illustrates an exemplary send tags user interface 240. The send tags user interface 240 may be presented to a user in response to the user assigning new and/or updated tags to a particular piece of mail and disposing of the particular piece of mail by selecting one of the buttons or graphical elements 230 of user interface 216. In another implementation, the send tags user interface 240 may be presented to the user at a different time. For example, the send tags user interface 240 may be presented to the user after the user chooses to end a session with the application or receiving device used by the user to exchange mail communications with other users. In this example, if the user has assigned updated or new tags to multiple pieces of opened mail during the session, the send tags user interface 240 may be presented multiple times in sequence, once for each of the multiple pieces of opened mail having assigned tag data that was updated by the user during the session. The interface 240 may be implemented using, for example, a client software module on a recipient electronic device or using a server software module in a server or host system. In some implementations, the interface 240 may be perceivable by a user through a web browser interface. In some implementations, the interface 240 may be combined with one or more of interfaces 200 and 216 into a single interface.

The send tags user interface 240 includes a message display 242, a send tags section 244, and graphical elements or buttons 246. The message display 242 includes text that informs the user that he or she has updated and/or added new tags to a piece of mail. The message display 242 also identifies the piece of mail by, for example, corresponding header information such as the sender of the mail, the subject of the mail, and the date that the mail was received. The message display 242 also includes text that asks the user whether he or she wishes to send one or more of the new or updated tags to the sender of the mail and/or to other recipients of the mail. In the illustrated example, the recipient added/updated tags of an e-mail from Jsupp@AQZcable.com having the subject "Project Progress Report" that was received at 7:32 pm on Mar. 26, 2003.

The send tags section 244 includes a list 244a of new or updated tags. Each new or updated tag has associated with it one or more user identifiers or addresses. The user identifiers or addresses correspond to the sender and, if applicable, to the other recipients of the e-mail. Each user identifier has a check box next to it. For each new or updated tag, the user may select or "check" the check box next to the user identifiers that the users wishes to receive the new or updated tag.

The graphical elements or buttons 246 include a view message button 246a, a send tags button 246b, and a do not send tags button 246c. The user may select the view message button 246a to perceive the message corresponding to message display 242. The user may select the send tags button 246b to send the tags to the sender and/or other recipients of the mail in accordance with the user's selection in the send tags section 244. The user may select the do not send tags button 246c to not send any tags irrespective of the user's selection in the send tags section 244.

The above-described send tags user interface 240 is merely one implementation of an interface that allows a user to send updated or new tags to other users. Other mechanisms and techniques for enabling the sending of tags are possible. For example, the user may choose to send tags to other users through the use of a graphical user interface having other controls, such as drop down menus, toolbars, pop-up dialog boxes, and pop-up menus, and having other configurations, such as different sections or groupings, that enable the sending of updated and/or new tags corresponding to one or more e-mails to one or more other users sequentially or concurrently.

In yet another implementation, the user is never presented with a send tags user interface 240. Instead, any new or updated tags are automatically sent (or not sent) in accordance with predetermined global and/or user-specific send tags rules. The send tags rules may be selected by or for the user and may be included in a user profile for the user. Examples of global and/or user-specific send tags rules include: (1) if the new, updated, and/or original tag is a particular tag (e.g., "Ultrasound Project"), then automatically send (or do not send) the new/updated tag to all other users that access the mail (i.e., to the sender and to all of the other recipients); (2) if the new, updated, and/or original tag is a particular tag (e.g., "Good Work"), then automatically send (or do not send) the new/updated tag to one or more particular users that access the mail (e.g., to one or more of the sender and the other recipients); (3) automatically send (or do not send) all updated/new tags to all other users that access the mail; (4) automatically send (or do not send) all updated/new tags to one or more particular users that access the mail; (5) if the subject matter (i.e., the contents of the subject field) of the mail matches a particular subject matter, then automatically send (or do not send) the new/updated tag to all other users that access the mail or to one or more particular users that access the mail; and (6) if the message contents of the e-mail include one or more terms that match particular predetermined terms (e.g., "testing" and "test"), automatically send (or do not send) the new/updated tag to all other users that access the mail or to one or more particular users that access the mail.

Figure 3A:
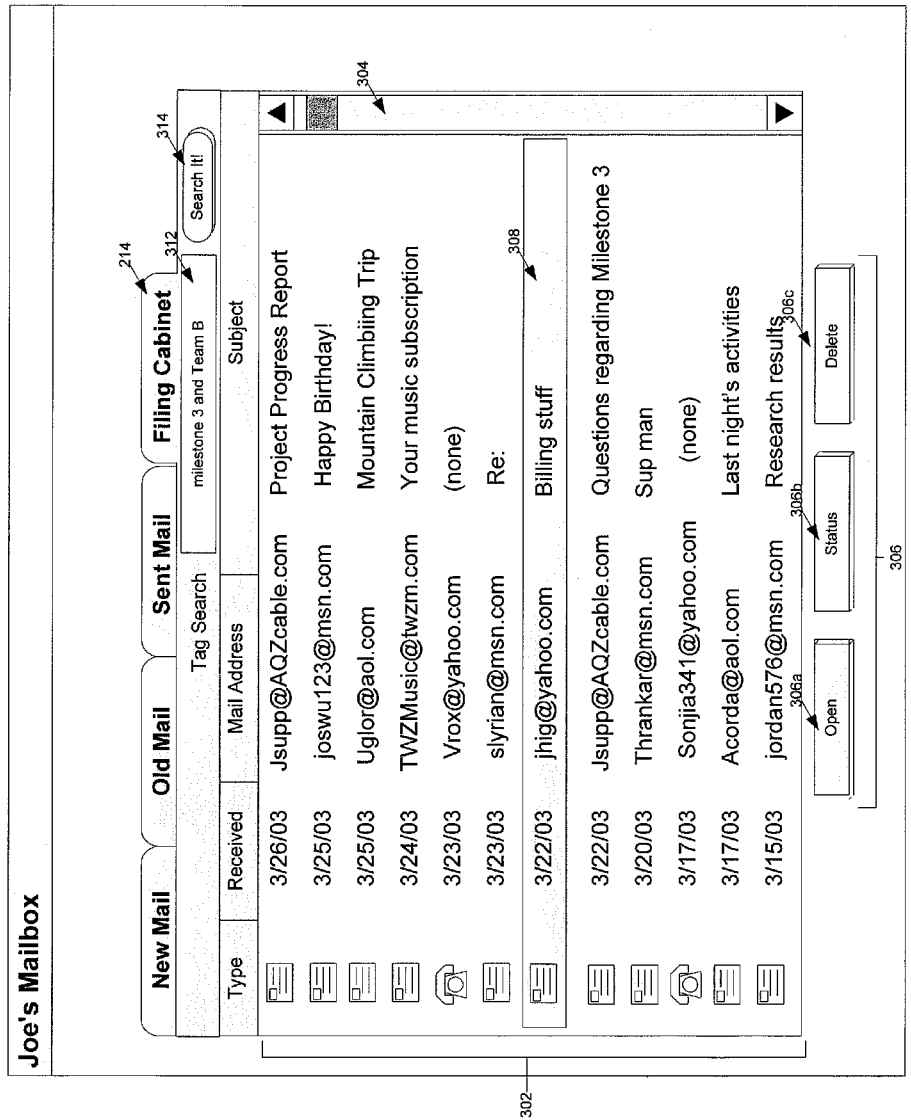
FIGS. 3A and 3B are diagrams illustrating exemplary mail system user interfaces that include a tag search control selectable by the user to perform a tag search.

FIG. 3A illustrates an exemplary system mail user interface 300 that includes a tag search control selectable by a user to perform a tag search of saved mail. The system mail user interface 300 corresponds to the system mail user interface 200 of FIG. 2A except that the filing cabinet tab/folder 214 is selected such that the mail displayed in the interface 300 is mail that has been saved by the user to the filing cabinet rather than new mail. Accordingly, the system mail user interface 300 includes a list 302 similar to the list 202 of FIG. 2A except that the list includes mail entries corresponding to mail saved by the recipient in the filing cabinet for later retrieval. The user interface 300 also includes a scroll bar 304 that may be manipulated by the user to scroll through the list 302 to perceive entries for additional mail not currently visible in the display.

The list 302 includes an entry 308 corresponding to a mail that has been selected by the user. The user interface 300 includes graphical elements or buttons 306 that may be selected by the user to interact with the mail corresponding to the selected entry 308. The graphical elements or buttons 306 include a button 306a selectable to open or view the mail corresponding to entry 308, a button 306b selectable to view the status of the mail corresponding to entry 308, and a button 306c selectable to delete the mail corresponding to entry 308.

The system mail user interface 300 also includes a search query box 312 and a start search graphical element or button 314. The user may input a search query by inputting a search query into the search query box 312 by, for example, manually typing in or otherwise selecting various search terms to be included in the search query. In some implementations, the search query is a Boolean text search query that includes terms and optionally connectors (e.g., AND, OR, NOT, etc.) between terms. In some implementations, the search query may also include wildcard symbols that represent one or more unspecified characters (e.g., the symbol "$" may represent one or more unspecified characters such that the term "hous$" would cover the words "house" and "household" and the term "%" may represent only a single unspecified character such that the term "hos %" would cover the words "host" and "hose" but not "hostel"). In the illustrated example, the search query inputted by the user into the search query box 312 is "milestone 3 and Team B." The user may submit the search query by selecting the button 314. In this implementation, the search query is applied against the assigned tag data of the mail in the filing cabinet tab/folder 214 (i.e., the mail corresponding to the entries in the list 302) to search for mail stored in the filing cabinet that satisfies the search query. In some implementations, the search query is applied against sender, other recipient, and recipient tag data irrespective of whether the sender, other recipient, and recipient tag data has been assigned to the mail or merely proposed for assignment to the mail (i.e., the sender, recipient, and other recipient tag data may be proposed tags that have yet to be accepted by the recipient either through automated rules or through manual interaction). In some implementations, the tag search query may be applied only on proposed tags, rather than assigned tags. The tag search query also may search for e-mails based only on sender tags (proposed or assigned), recipient tags (proposed or assigned), and/or other recipient tags (proposed or assigned).

In some implementations, a user interface similar to user interface 300 may be presented to the user in response to the user selecting any one of the other tabs/folders in user interface 200 to perform a tag search of mail in the selected tab/folder. For example, a user interface similar to user interface 300 may be presented to the user in response to the user selecting the old mail tab/folder 210. The user may then input a search query into a search query box similar to box 312 and select a button similar to button 314 to perform a tag search of the mail in the old mail tab/folder 210. In implementations in which the user is able to perform a tag search of mail in the new mail tab/folder, the search query is applied against sender, other recipient, and recipient tag data that was automatically assigned to the mail by tag generation and acceptance rules and/or that was proposed for assignment to the mail by the other recipients and/or the sender.

In some implementations, the user may manually specify that the tag search should be applied to the mail in a particular folder/tab, group of folders/tabs, and/or all folders/tabs. The user may, for example, manually specify the mail folders/tabs through manual selection in a pop-up menu and/or a drop-down list and/or by browsing and flagging folders in a displayed folder hierarchy.

Figure 3B:
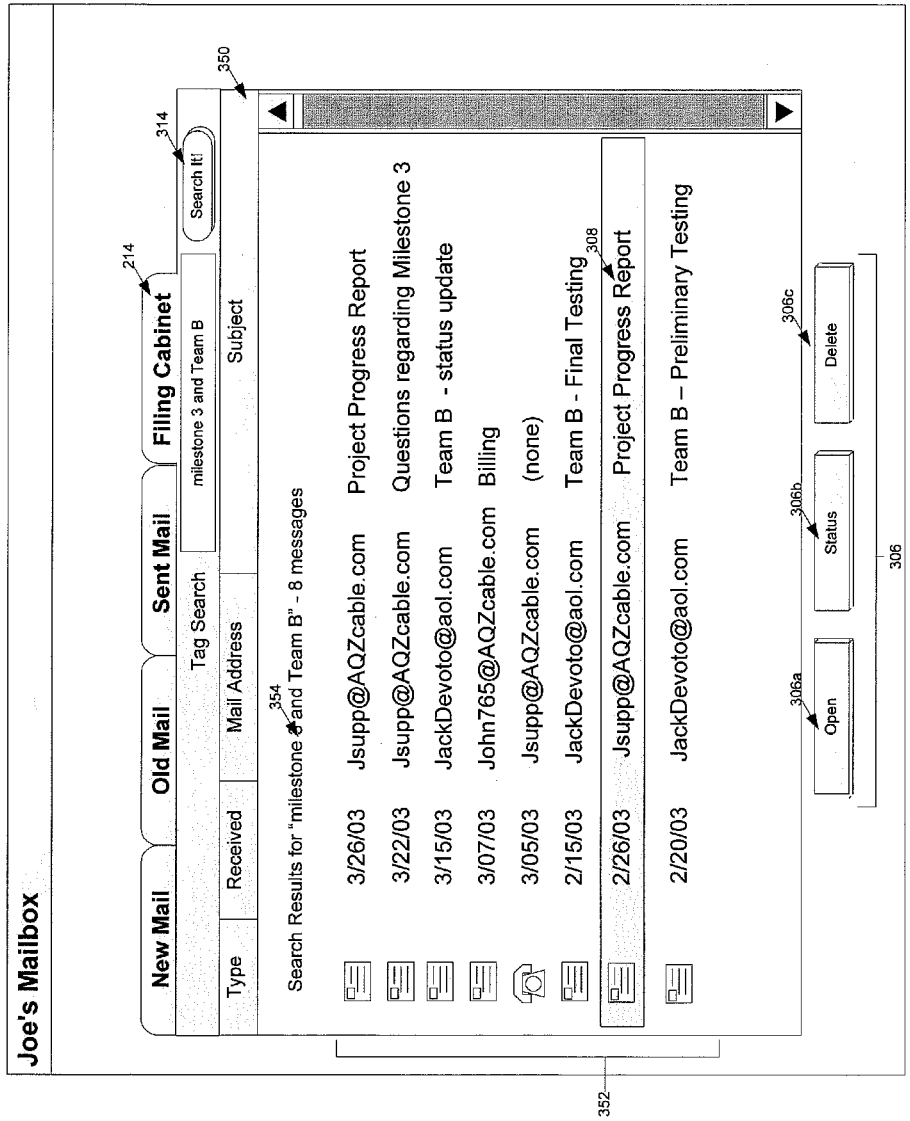

FIG. 3B illustrates an exemplary system mail user interface 350 that corresponds to system mail user interface 300 after the user has submitted the search query "milestone 3 and Team B." The user interface 350 includes a list of entries 352 corresponding to mail that was assigned tags that satisfy the search query "milestone 3 and Team B." The user interface 350 also includes search query summary text 354 that, for example, identifies the search query and indicates the number of messages that satisfied the search query. In the illustrated example, the list of entries 352 includes eight entries and the search query summary text 354 states that the search results for the query "milestone and Team B" are eight messages.

Figure 4:
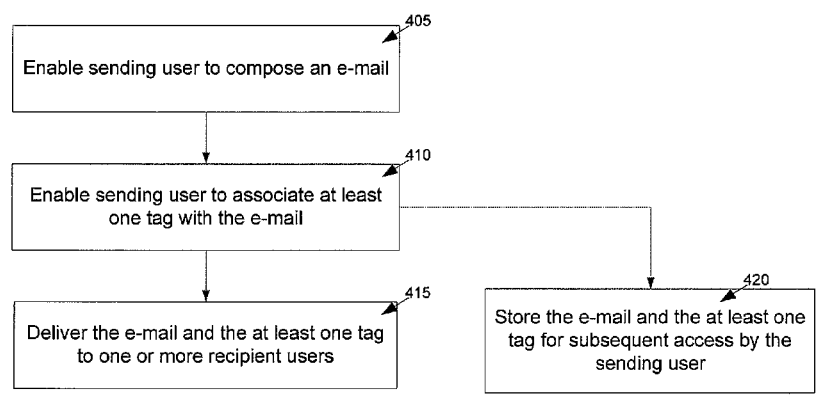
FIG. 4 is a flow chart illustrating a process for enabling a user to compose an e-mail, intelligently assign tags to the e-mail, and initiate delivery of the e-mail to one or more other users.

FIG. 4 illustrates an example of a process 400 for enabling a user to compose an e-mail, intelligently annotate or assign tags to the e-mail, and initiate delivery of the e-mail to one or more recipient users. The operations in flow chart 400 are described generally as being performed by a processor. In some implementations, the processor may be included in an electronic device or system configured to send and receive communications over a network. For example, the processor may be included in an electronic device or system of a host, a content provider, a service provider, or a user. In another example, the operations in flow chart 400 may be performed by multiple processors included in one or more electronic devices or systems. Moreover, while the process 400 is described as being applied to e-mails, the same process may be applied to any electronic messages that are sent by users to recipient users to communicate with the recipient users and that are capable of being stored by the recipient users for subsequent access. For example, the process 400 may be applied to voicemails in addition to or as an alternative to e-mails.

Figure 5B:
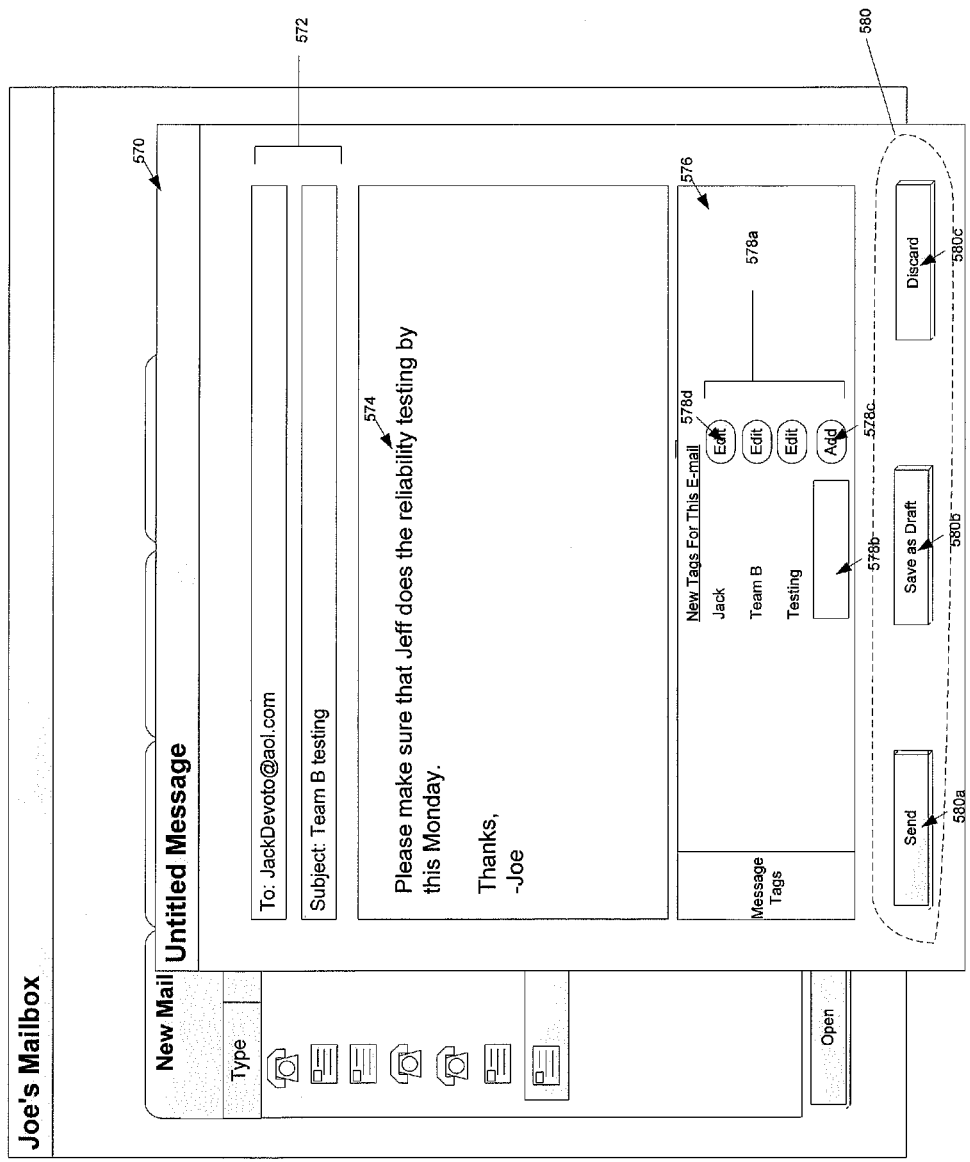

The processor enables a sending user to compose an e-mail (405). For example, the processor may enable the sending user to interact with a user interface of an e-mail communications application program accessible through a sending electronic device. In another implementation, the e-mail sender may compose both e-mails and voicemails by interacting with a user interface of a unified communications application program accessible through the sending electronic device. As described in further detail below, FIGS. 5A and 5B show examples of graphical user interfaces that enable a sending user to compose an e-mail.

The processor enables the sending user to associate at least one tag with the e-mail (110). For example, the user may assign the at least one tag to the e-mail by interacting with the same graphical user interface used to compose the e-mail. An example of such a user interface is shown in FIGS. 5A and 5B, which are described in further detail below. In another implementation, predetermined tag generation rules automatically assign tags to the e-mail without need for user interaction.

The predetermined tag generation rules may be global and/or user-specific rules. Tag generation may include selection of a predetermined or previously stored tag from among a group of predetermined or previously stored tags that were specified by or for the user. Examples of global or user-specific tag generation rules include: (1) if one of the recipients of the e-mail is a particular recipient (e.g., Sorpentor@123456.com), then automatically generate and assign a particular tag (e.g., "Personal") to the e-mail; (2) if the subject matter (i.e., the contents of the subject field) of the mail matches a particular subject matter, automatically generate and assign a particular tag to the e-mail; and (3) if the message contents of the e-mail include one or more terms that match particular predetermined terms (e.g., "testing" and "test"), automatically generate and assign a particular tag (e.g., the tag "Testing") to the e-mail.

The processor delivers the e-mail and the at least one tag to one or more recipient users (415). The delivery may be initiated in response to a user selecting to send the e-mail in a user interface of a communications program. For example, the delivery may be initiated in response to the user selecting graphical element or button 564a of interface 550 of FIG. 5A or graphical element or button 580a of interface 570 of FIG. 5B.

The processor may store the e-mail and the at least one tag in a data store to provide the sending user with the ability to subsequently use the at least one tag to access the e-mail (420). For example, the e-mail may be stored in a "sent folder" or other location, which may be subsequently searched via a tag search like the one described above with respect to FIGS. 3A and 3B.

FIGS. 5A and 5B illustrate exemplary user interfaces that enable a user to compose a mail, assign tags to the mail, and initiate delivery of the mail to one or more recipients. In particular, FIG. 5A illustrates an exemplary reply/forward mail user interface 550 that may be manipulated by the user to compose, tag, and initiate delivery of a mail that forwards or replies to a previously opened or accessed mail. FIG. 5B illustrates an exemplary compose new mail user interface 570 that may be manipulated by the user to compose, tag, and initiate delivery of an entirely new mail.

Referring to FIG. 5A, a user may interact with the reply/forward mail user interface 550 to compose a mail in reply to a mail previously opened or accessed by the user (hereinafter referred to as the "parent" mail). For example, the reply/forward mail user interface 550 may be presented to the user in response to the user selecting the button 230a (reply button) or the button 230c (forward button) in user interface 216. The interface 550 may be implemented using, for example, a client software module on a recipient electronic device or using a server software module in a server or host system. In some implementations, the interface 550 may be perceivable by a user through a web browser interface. In some implementations, the interface 550 may be combined with one or more of interfaces 200, 216 and 240 into a single interface.

The reply/forward mail user interface 550 includes a header section 552, a message text section 554, a tag assignment interface 556 and graphical elements or buttons 564. The header section 552 includes a recipient address field and a subject field. If the user interface 550 is presented to the user in response to the user selecting to reply to the parent mail, the recipient address field, when first displayed to the user, is automatically populated with the mail address of the sender of the parent mail. If, on the other hand, the user interface 550 is presented to the user in response to the user selecting to forward the parent mail, the recipient address field, when first displayed to the user, is left blank. The subject field also is automatically populated with the same subject matter as that of the parent mail and may include an additional text designation (e.g., "Re:") to designate that the new mail is a reply (e.g., "Re:") or is a forward (e.g., "Fw:") of the parent mail.

In the illustrated example, the recipient address field has been automatically populated with the address of the sender of the parent mail, Jsupp@AQZcable.com and the subject field has been automatically populated with a text designation "Re:" and the subject matter of the parent mail "Project Progress Report." Accordingly, the e-mail is a reply to the parent e-mail shown in FIG. 2B. The user is able to subsequently modify and/or delete the subject matter automatically populated in the subject field and any of the addresses automatically populated in the address field by, for example, typing in or otherwise inputting any changes directly into the address field and/or subject field.

The message text section 554 includes new message text 554a that is inputted by the user and previous message text 554b that was automatically populated in the message text section 554 when first displayed to the user. The previous message text 554b may include the header information and the message text information of the parent mail. Scroll bar 554c has been added to enable the user to scroll through the text in message text section 554. In the illustrated example, the user has inputted the new message text "Thanks for the update. Good work on this. —Joe" and the previous message text 554b corresponds to the header information and message text of the mail shown in FIG. 2B.

The tag assignment interface 556 is a user interface with which the sender of the mail may interact to assign tags to the mail he or she is about to send. In the displayed exemplary implementation, the tag assignment interface 556 includes a section 556a that displays proposed tags sent by others for the parent mail, a section 556b that displays tags assigned by the user to the parent mail, and a section 556c that displays tags proposed or assigned by the user to the current mail.

The section 556a includes a list of entries that display the tags that the sender of the parent mail and other recipients of the parent mail proposed should be assigned to the parent mail (which typically correspond to the tags that the sender and other recipients assigned to their copy of the parent mail). An exemplary entry may include a check box 558a, a tag 558b, and a graphical element 558c (e.g., a graphical button). The user may select (i.e., "check") the check box 558a to assign the tag 558b to the e-mail that is being composed. The user also may select the graphical element 558c to edit the tag. If the recipient edits the tag 558b, the unedited version of the tag 558b may remain in the section 556a with no check in the check box 558a and the edited version of tag 558b may automatically be placed as a new tag in the tag section 556c. In some implementations, the section 556a only includes entries that display tags that the sender of the parent mail and the other recipients of the parent mail proposed and that the recipient accepted and assigned to the parent mail.

In some implementations, the section 556a may include an indicator identifying which tags were updated/edited by the recipient. In some implementations, the section 556a may include user identifiers that identify the sender and the other recipients that proposed the corresponding tags 558b. In the illustrated example, other users proposed that the parent e-mail be assigned the tags "Team B", "Progress Report" and "March 03". Of these proposed tags, the user has selected to assign the tags "Team B" and "Progress Report" to the current e-mail, which is a reply to the parent e-mail.

The section 556b includes a list of entries that display the tags that the user assigned to the parent mail. An exemplary entry may include a check box 560a, a tag 560b, and a graphical element 560c (e.g., a graphical button). The user may select (i.e., "check") the check box 560a to assign the tag 560b to the e-mail that is being composed. The user also may select the graphical element 560c to edit the tag. If the recipient edits the tag 560b, the unedited version of the tag 560b may remain in the section 556b with no check in the check box 260a and the edited version of tag 560b may automatically be placed as a new tag in the tag section 556c. In some implementations, the section 556b may include an indicator identifying which tags were updated/edited by the recipient. In some implementations, the user may be prompted to choose whether or not to update the tag in the parent mail and/or in all mails that have been assigned the original tag. In the illustrated example, the user assigned the tags "Jim" and "milestone 3" to the parent e-mail. The user has selected to assign both of these tags to the current e-mail, which is a reply to the parent e-mail.

The section 556c includes a list of entries that display new tags assigned to the mail by the recipient. The recipient is able to add new tags 562a to be assigned to the mail by inputting the new tag into the dialog box 562b and selecting the graphical element 562c (e.g., a graphical button). In some implementations, the user is able to add a new tag 562a by selecting from among multiple prestored tags previously inputted by the user or by other users (e.g., the sender of the mail or other recipients of the mail). In the illustrated example, the user has assigned a new tag "Good Work" to the e-mail. In some implementations, the list of new tags 562a also my include an indicator that identifies the tag as an updated tag or an entirely new tag. The user may select to edit any of the assigned tags by selecting, for example, a button 562d.

In some implementations, the tag assignment interface 556 is populated when first displayed to the user and prior to any user interaction in accordance with global and/or user-specific tag generation rules. In some implementations, the tag assignment interface 556 is not shown because the tags assigned to the mail are automatically assigned in accordance with the global and/or user-specific tag generation rules without requiring user interaction.

The above tag assignment interface 556 is merely one implementation of an interface that allows a user to assign tags to mail. Other mechanisms and techniques for enabling mail tag assignment are possible. For example, the user may assign tags to the e-mail through the use of a graphical user interface having other controls, such as drop down menus, toolbars, pop-up dialog boxes, and pop-up menus, and having other configurations, such as different sections or groupings, that enable assignment of tags to one or more e-mails sequentially or concurrently.

The graphical elements or buttons 564 include a send button 564a, a save as draft button 564b, and a discard button 564c. The user may select the send button 564a to send the mail and the assigned tags (as assigned by the user through interaction with tag assignment interface 556) to the recipient addresses designated in the address field of header section 552. In some implementations, the sender is prompted to choose whether or not he wishes to send the assigned tags to the recipients. If the sender chooses to send the assigned tags, the sender also may be able to choose which of the e-mail recipients will receive the assigned tags as proposed tags. The tags sent with the mail to the recipients are designated as sender tags because the sender of the mail assigned the tags. Selecting the send button 564a also may store the message as "Sent Mail" and store the tag data for the mail in accordance with the selected tags displayed in the tag assignment interface 556. The stored mail may be subsequently accessed by the user, for example, through selection of the sent mail tab 212 of interface 200 and/or through input of a tag search as described previously with respect to FIG. 3A.

The user may select the save as draft button 564b to save a draft of the mail without sending the mail. The user may subsequently access the draft to revise as necessary prior to sending. The user may select the discard button 564c to discard the draft of the mail without sending the mail.

Referring to FIG. 5B, a user may interact with the compose new mail user interface 570 to compose a new mail. In one implementation, the compose new mail user interface 570 may be presented to the user in response to the user selecting the graphical element or button 215 in user interface 200. The interface 570 may be implemented using, for example, a client software module on a recipient electronic device or using a server software module in a server or host system. In some implementations, the interface 570 may be perceivable by a user through a web browser interface. In some implementations, the interface 570 may be combined with one or more of interfaces 200, 216, 240 and 550 into a single interface.

The compose new mail user interface 570 includes a header section 572, a message text section 574, a tag assignment interface 576 and graphical elements or buttons 580. The header section 572 includes a recipient address field and a subject field. When first displayed to the user, the recipient address field and the subject field are typically blank. The user may then input one or more recipient addresses into the recipient address field (e.g., by selecting the addresses from a drop-down list or menu, or by typing in the addresses directly into the field) and may input a subject for the mail in the subject field (e.g., by selecting the subject from a drop-down list or menu or by typing in the subject directly into the field). In the illustrated example, the recipient address inputted by the user is "JackDevoto@aol.com", and the subject of the mail inputted by the user is "Team B testing."

The message text section 574 includes new message text that is inputted by the user (e.g., by typing in the message text using a keyboard or other input device). In the illustrated example, the user has inputted the new message text "Please make sure that Jeff does the reliability testing by this Monday. Thanks,—Joe."

The tag assignment interface 576 is a user interface with which the sender of the mail may interact to assign tags to the new mail he or she is about to send. In the displayed exemplary implementation, the tag assignment interface 576 includes a list of entries that display tags assigned to the new mail by the user. The user is able to add a tag 578a to be assigned to the mail by inputting the tag into the dialog box 578b and selecting the graphical element 578c (e.g., a graphical button). The user may select to edit any of the assigned tags by selecting, for example, a button 578d. In some implementations, the user is able to add a tag 578a by selecting from among multiple prestored tags previously inputted by the user or by other users (e.g., the sender of the mail or other recipients of the mail). In the illustrated example, the user has assigned the tags "Jack", "Team B", and "Testing" to the new e-mail.

In some implementations, the tag assignment interface 576 is populated with proposed tags when first displayed to the user and subsequent to the user inputting header information data and/or message content data in accordance with global and/or user-specific tag generation rules. The tag assignment interface 576 may be populated dynamically and optionally in real time or near real time as the user inputs the header information data and/or message content data. Tag generation may include selection of a predetermined or previously stored tag from among a group of predetermined or previously stored tags that were specified by or for the user. The tag generation rules may be selected by or for the user and may be included in a user profile for the user.

Examples of global or user-specific tag generation rules include: (1) if one of the recipients of the e-mail is a particular recipient, then automatically generate and assign a particular tag to the e-mail; (2) if the subject matter (i.e., the contents of the subject field) of the mail matches a particular subject matter, automatically generate and assign a particular tag to the e-mail; and (3) if the message contents of the e-mail include one or more terms that match particular predetermined terms, automatically generate and assign a particular tag to the e-mail.

In this implementation, the recipient may perceive the automatically generated and assigned tag in the recipient tag assignment section 576 and may reject the automatic assignment of the tag by, for example, unchecking a corresponding check box (not shown). In some implementations, the tag assignment interface 576 is not shown because the tags are generated and assigned to the mail automatically in accordance with the global and/or user-specific tag generation rules without requiring user interaction.

The above tag assignment interface 576 is merely one implementation of an interface that allows a user to assign tags to mail. Other mechanisms and techniques for enabling mail tag assignment are possible. For example, the user may assign tags to the e-mail through the use of a graphical user interface having other controls, such as drop down menus, toolbars, pop-up dialog boxes, and pop-up menus, and having other configurations, such as different sections or groupings, that enable assignment of tags to one or more e-mails sequentially or concurrently.

The graphical elements or buttons 580 include a send button 580a, a save as draft button 580b, and a discard button 580c. The user may select the send button 580a to send the mail to the recipient addresses designated in the address field of header section 572 and also send the assigned tags (as assigned by the user through interaction with tag assignment interface 576) as proposed tags to the recipient addresses designated in the address field of header section 572. In some implementations, the sender is prompted to choose whether or not he wishes to send the assigned tags to the recipients. If the sender chooses to send the assigned tags, the sender also may be able to choose which of the e-mail recipients will receive the assigned tags as proposed tags. The tags sent with the mail to the recipients are designated as sender tags because the sender of the mail assigned the tags. Selecting the send button 580a also may store the message as "Sent Mail" and store the tag data for the mail in accordance with the selected tags displayed in the tag assignment interface 576. The stored mail may be subsequently accessed by the user, for example, through selection of the sent mail tab 212 of interface 200 and/or through input of a tag search as described previously with respect to FIG. 3A.

Figure 6:
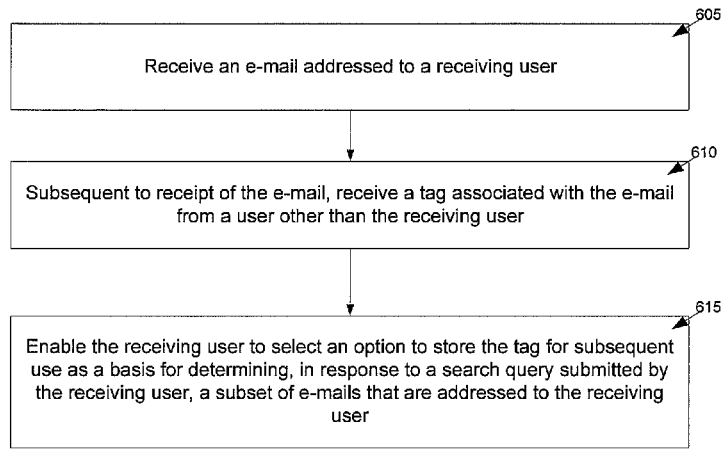
FIG. 6 is a flow chart illustrating a process for enabling a recipient of an e-mail to accept or reject a proposed tag for an e-mail.

FIG. 6 illustrates an example of a process 600 for enabling a recipient of an e-mail to accept or reject a proposed tag for an e-mail that was received by the recipient from another user subsequent to receipt of the e-mail by the recipient. The operations in flow chart 600 are described generally as being performed by a processor. In some implementations, the processor may be included in an electronic device or system configured to send and receive communications over a network. For example, the processor may be included in an electronic device or system of a host, a content provider, a service provider, or a user. In another example, the operations in flow chart 600 may be performed by multiple processors included in one or more electronic devices or systems. Moreover, while the process 600 is described as being applied to e-mails, the same process may be applied to any electronic messages that are sent by users to recipient users to communicate with the recipient users and that are capable of being stored by the recipient users for subsequent access. For example, the process 600 may be applied to voicemails in addition to or as an alternative to e-mails.

The processor receives an e-mail addressed to a receiving user (605). For example, the processor may receive, over a network, an e-mail from electronic devices associated with a sending user. The e-mail sender may send the e-mail by interacting with an e-mail communications application program accessible through a sending electronic device. In another implementation, the e-mail sender may send a voicemail, rather than an e-mail, by interacting with a unified communications application program accessible through the sending electronic device.

Subsequent to receipt of the e-mail, the processor receives one or more proposed tags associated with the e-mail from a user other than the receiving user (610). For example, the processor may receive one or more proposed tags from the sending user and/or from another recipient of the e-mail. The sending user may have chosen to send the proposed tag as a proposed new tag for the e-mail or as a proposed update to a tag previously sent with the e-mail. Another recipient of the e-mail may have assigned new or updated tags to the e-mail after having opened and viewed the e-mail (e.g., through interaction with the individual mail user interface 216 shown in FIG. 2B). The other recipient may then have chosen to send the new or updated tags to the receiving user (e.g., through interaction with the send tags interface 240 shown in FIG. 2C) as proposed tags.

The processor may enable the receiving user to select an option to assign the proposed tags to the e-mail, thereby storing the tags for subsequent use as a basis for determining, in response to a search query submitted by the receiving user, a subset of e-mails that are addressed to the receiving user (615). In some implementations, the manner in which the processor enables the receiving user to assign the proposed new and/or updated tags to an e-mail may vary depending on whether the user has already accessed or opened the e-mail.

For example, if the user has already opened or accessed the received e-mail when the proposed new or updated tags are received, the receiving user may be presented with an interface that enables the receiving user to perceive the proposed one or more tags and select which, if any, of the new and/or updated tags will be assigned to the corresponding piece of mail. In one implementation, the user is presented with an interface 700 shown in FIG. 7. As described below, the user may interact with the interface 700 to accept or reject assignment of the new and/or updated tags received from the other user. The interface 700 may be presented to a user for e-mails that the user has already opened and tagged via, for example, interaction with the interface 216 of FIG. 2B.

If the user has not already opened or accessed the e-mail, the proposed tag data of the e-mail may be automatically changed in response to receipt of the new or updated tags. In particular, new tags proposed for an e-mail by another user may be automatically added as new proposed tags in a manner that is transparent to the receiving user such that when the receiving user subsequently opens or accesses the e-mail for the first time, the receiving user perceives the new proposed tags for the e-mail. Similarly, proposed updated tags may automatically replace the original proposed tags in a manner that is transparent to the receiving user such that when the receiving user subsequently opens or accesses the e-mail for the first time, the receiving user perceives the proposed updated tag for the e-mail rather than the proposed original tag. In another implementation, the receiving user perceives both the proposed updated tag and the proposed original tag when opening the e-mail for the first time. In this implementation, the receiving user is able to choose whether to assign the updated tag and/or the original tag to the e-mail.

For example, if JoeRenner@aol.com receives and opens the e-mail shown in FIG. 2B from Jsupp@AQZcable.com prior to JackDevoto@aol.com opening and assigning tags to the e-mail, the interface 216 shown in FIG. 2B may not have shown any proposed tags in the other tags assignment section 222*b*. However, as shown in FIG. 2B, JackDevoto@aol.com opened the e-mail and assigned tags to the e-mail prior to JoeRenner@aol.com opening the e-mail for the first time. In particular, JackDevoto@aol.com assigned a new tag "March 03" to the e-mail, which JackDevoto@aol.com chose to send or otherwise make accessible as a proposed tag to JoeRenner@aol.com (through, for example, JackDevoto@aol.com interacting with an interface similar to interface 240 of FIG. 2C). Since JoeRenner@aol.com had already received the e-mail but had yet to open or access the e-mail, the new proposed tag was automatically added to the proposed tag data for the e-mail and, accordingly, interface 216 of FIG. 2B shows the new proposed tag "March 03" in the other tags assignment section 222*b* upon JoeRenner@aol.com subsequently opening or accessing the e-mail for the first time. If, however, JoeRenner@aol.com had already opened, accessed, and tagged the e-mail, JoeRenner@aol.com may be presented with an interface similar to the interface 700 shown in FIG. 7, which allows him to explicitly accept or reject the assignment of the new proposed tag.

Continuing the example, JackDevoto@aol.com may subsequently decide to change or update the tag "March 03" to be "First Quarter 03" and send the proposed tag update to JoeRenner@aol.com. If JoeRenner@aol.com has not yet opened or accessed the e-mail, the proposed updated tag may automatically replace the proposed original tag for the e-mail and, accordingly, the interface 216 of FIG. 2B may show the proposed updated tag "First Quarter 03" instead of or in addition to the proposed original tag "March 03" in the other tags assignment section 222*b* upon JoeRenner@aol.com subsequently opening or accessing the e-mail for the first time. If, however, JoeRenner@aol.com had already opened, accessed, and tagged the e-mail, JoeRenner@aol.com may be presented with an interface similar to the interface 700 shown in FIG. 7, which allows him to explicitly accept or reject assignment of the proposed updated tag.

In some implementations, the receiving user may specify or select global or user-specific tag update rules that automatically recommend that the user accept or reject proposed new or updated tags for previously opened and tagged e-mails or automatically assign new or updated tags for previously opened and tagged e-mails. The global or user-specific tag update rules may recommend that the user accept proposed new or updated tags for e-mails by automatically checking one or more of the checkboxes in the interface 240 to recommend acceptance when the interface 240 is first presented to the user and before the user interacts with the interface 240. Alternatively, the interface 240 may include a graphical indicator or icon (e.g., a gold star) next to those tags that are recommended for acceptance. The tag update rules may recommend that a user not accept proposed new or updated tags for e-mails by not checking the corresponding checkboxes and/or by adding a graphical indicator or icon (e.g., an X) next to any tags that have been rejected.

The tag update rules also may automatically assign new and updated tags in a manner that is transparent to the user. In this implementation, the receiving user is not presented with the interface 700 shown in FIG. 7 even if the user has already opened, accessed, and assigned tags to the e-mail to which the new tag or updated tag corresponds.

The tag update rules may be selected by or for the user and may be included in a user profile for the user. Example of global or user-specific tag update rules include: (1) if the new or updated tag is a particular tag (e.g., "Team B"), then accept (or reject) or recommend acceptance (or rejection) of the new or updated tag; (2) if the new or updated tag is from a particular sender (e.g., Jsupp@AQZcable.com), then accept (or reject) or recommend acceptance (or rejection) of the new or updated tag; (3) if the new or updated tag is from a particular other recipient (e.g., JackDevoto@aol.com), then accept (or reject) or recommend acceptance (or rejection) of the new or updated tag; (4) accept (or reject) or recommend acceptance (or rejection) of all new or updated tags from the sender of the mail; and (5) accept (or reject) or recommend acceptance (or rejection) of all new or updated tags from other recipients of the mail.

Figure 7:
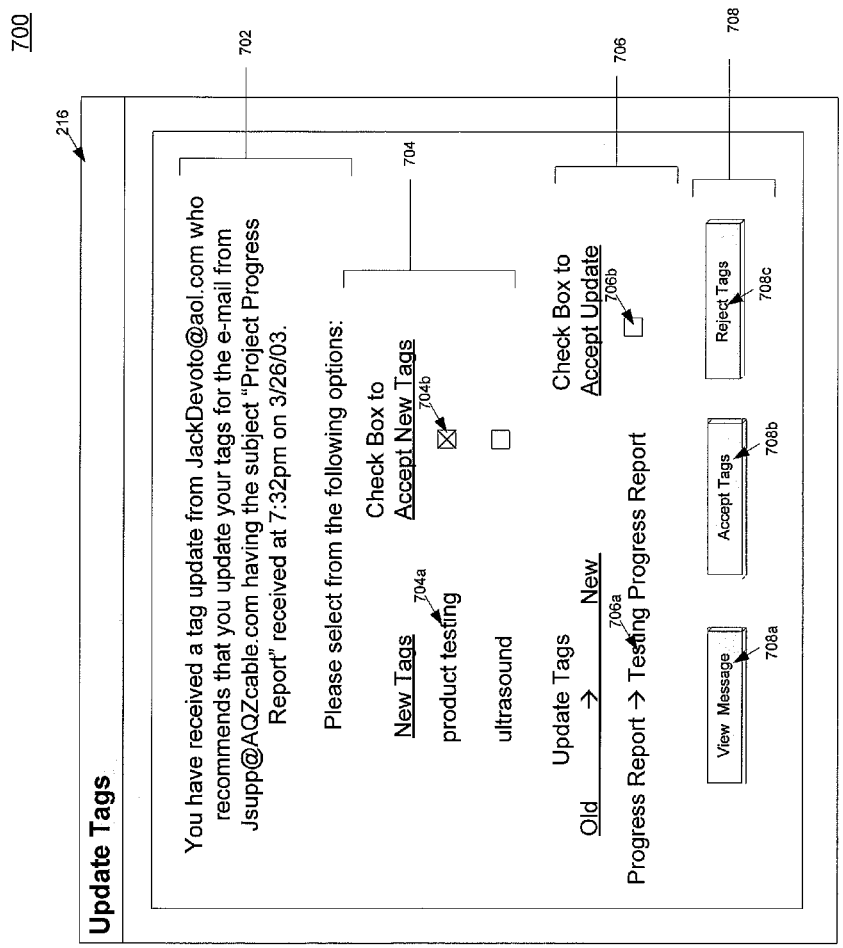
FIG. 7 is a diagram illustrating an exemplary new/updated tag acceptance user interface.

FIG. 7 illustrates an exemplary new/updated tag acceptance user interface 700. The interface 700 may be presented to a user subsequent to the user having received, opened and tagged an e-mail. In some implementations, the interface 700 may be presented to the user in response to and upon the user initiating a session with a mail application program or receiving user device. The interface 700 may be presented multiple times in sequence, once for each submission by another user of new/updated tags for a particular previously opened and tagged e-mail. Upon the user accepting a particular new/updated tag for the e-mail by interacting with interface 700, a new interface 700 corresponding to a new user and/or e-mail may be presented to the user. In this manner, the user may accept new/updated tags at the beginning of a mail application session prior to accessing any pieces of mail. In some implementations, the user is presented with tag update information (i.e., proposed new tags and/or updated tags) via, for example, interface 700 for a particular mail in real-time or near real-time at any time during the user's session with the mail application program and in response to and optionally at the time that tag update information is first made available by another user for the particular mail.

The interface 700 may be implemented using, for example, a client software module on a recipient electronic device or using a server software module in a server or host system. In some implementations, the interface 700 may be perceivable by a user through a web browser interface. In some implementations, the interface 700 may be combined with one or more of interfaces 200, 216, 240, 550 and 570 into a single interface.

The new/updated tag acceptance user interface 700 includes a message display 702, a new tags section 704, an updated tags section 706, and graphical elements or buttons 708. The message display 702 includes text that informs the user that he or she has received a tag update. The message display 702 may include information that enables the user to identify the particular e-mail (or e-mails) associated with the tag update (e.g., header information, such as e-mail sender, subject, and date of receipt) and the particular user that provided the proposed tag update (e.g., the user's e-mail address, screen name or other user identifier). The message display 702 also may include text that prompts the user to select from among a set of options that enable the user to accept or reject the proposed new/updated tags. In the illustrated example, the user received a tag update from JackDevoto@aol.com for an e-mail received from Jsupp@AQZcable.com having the subject "Project Progress Report" that was received at 7:32 pm on Mar. 26, 2003.

The new tags section 704 includes a list 704a of proposed new tags received from the other user (e.g., JackDevoto@aol.com). For each proposed new tag, the user may select or "check" the check box 704b next to the new tag that the user wishes to assign to the mail (or mails). In the illustrated example, the new tags received from the other user are "product testing" and "ultrasound".

The update tags section 706 includes a list 706a of proposed updated tags received from the other user (e.g., JackDevoto@aol.com). The list 706a includes the original tag (i.e., the "old" tag—which may be an assigned old tag or a proposed old tag) and the proposed updated tag (i.e., the "new" tag). For each updated tag, the user may select or "check" the check box 706b next to the updated tag that the user wishes to assign to the mail (or mails). In some implementations, the list 706a indicates whether the update is for an original tag that was assigned to the mail by the user or whether the update is for a proposed tag that was not assigned to the mail by the user.

The graphical elements or buttons 708 include a view message button 708a, an accept tags button 708b, and a reject tags button 708c. The user may select the view message button 708a to perceive the message (or messages) corresponding to message display 702. The user may select the accept tags button 708b to assign the proposed new or updated tags to the e-mail (or e-mails) in accordance with the user's selection in the sections 704 and 706. The user may select the reject tags button 708c to not assign any of the proposed new and/or updated tags irrespective of the user's selection in the sections 704 and 706.

The above-described new/updated tag acceptance user interface 700 is merely one implementation of an interface that allows a user to assign proposed updated or new tags received from other users. Other mechanisms and techniques for enabling the assigning of proposed new tags and/or tag updates received from other users are possible. For example, the user may choose to assign proposed new and/or updated tags from other users through the use of a graphical user interface having other controls, such as drop down menus, toolbars, pop-up dialog boxes, and pop-up menus, and having other configurations, such as different sections or groupings, that enable the accepting of proposed updated and/or new tags corresponding to one or more e-mails from one or more other users sequentially or concurrently.

In another implementation, the user may interact with an interface that enables the user to view and/or accept or reject all tag updates/new tags from a particular user for multiple different mails in a single display that displays all of the tag updates/new tags from that particular user. In another implementation, the user may interact with an interface that enables the user to accept or reject all tag updates/new tags for a particular mail from multiple different users that displays all of the tag updates/new tags for that particular mail. In some implementations, the user may interact with an interface that enables the user to accept a tag update for not just one e-mail previously associated with or assigned the original tag but for all e-mails that were previously associated with or assigned the original tag.

In some implementations, the user is presented with tag update information via, for example, a modified version of interface 216 for a particular previously opened mail upon the user accessing or opening the particular mail a second time. The modified version of interface 216 may indicate and graphically distinguish between assigned tags, proposed old tags (i.e., proposed tags that were previously presented to the user but not assigned to the mail), proposed new tags (i.e., new tags never previously presented to the user), and updated tags (i.e., tags that were updated since the last time the tags were presented to the user). For example, assigned tags may be shown via checks in their corresponding checkbox; proposed old tags previously presented to and considered by the user may be shown via the absence of checks in their corresponding checkboxes; proposed new tags not previously presented to the user may be shown via a graphical icon or indicator (e.g., a yellow star), and proposed updated tags may be shown via a different graphical icon or indicator (e.g., a blue star) in addition to or in place of the original tags previously presented to the user. In some implementations, the checkboxes of the proposed new and updated tags in the modified version of interface 216 may be checked in accordance with tag update rules as described previously. The user may interact with the modified version of interface 216 to not only assign the proposed new or updated tags to the mail but also to change the assignment of tags that were previously assigned to the mail or considered for assignment to the mail.

In some implementations, the user may select a graphical element or button in the user interface 700 or the modified user interface 216 for each proposed tag update of a particular tag to automatically accept the tag update for all e-mails that have been assigned the particular tag. For example, the user may select a button or checkbox next to checkbox 706b to change the tag "Progress Report" to "Testing Progress Report" for all e-mails that have been assigned that tag, not just for the e-mail from Jsupp@AQZcable.com described in message display 702.

Figure 8:
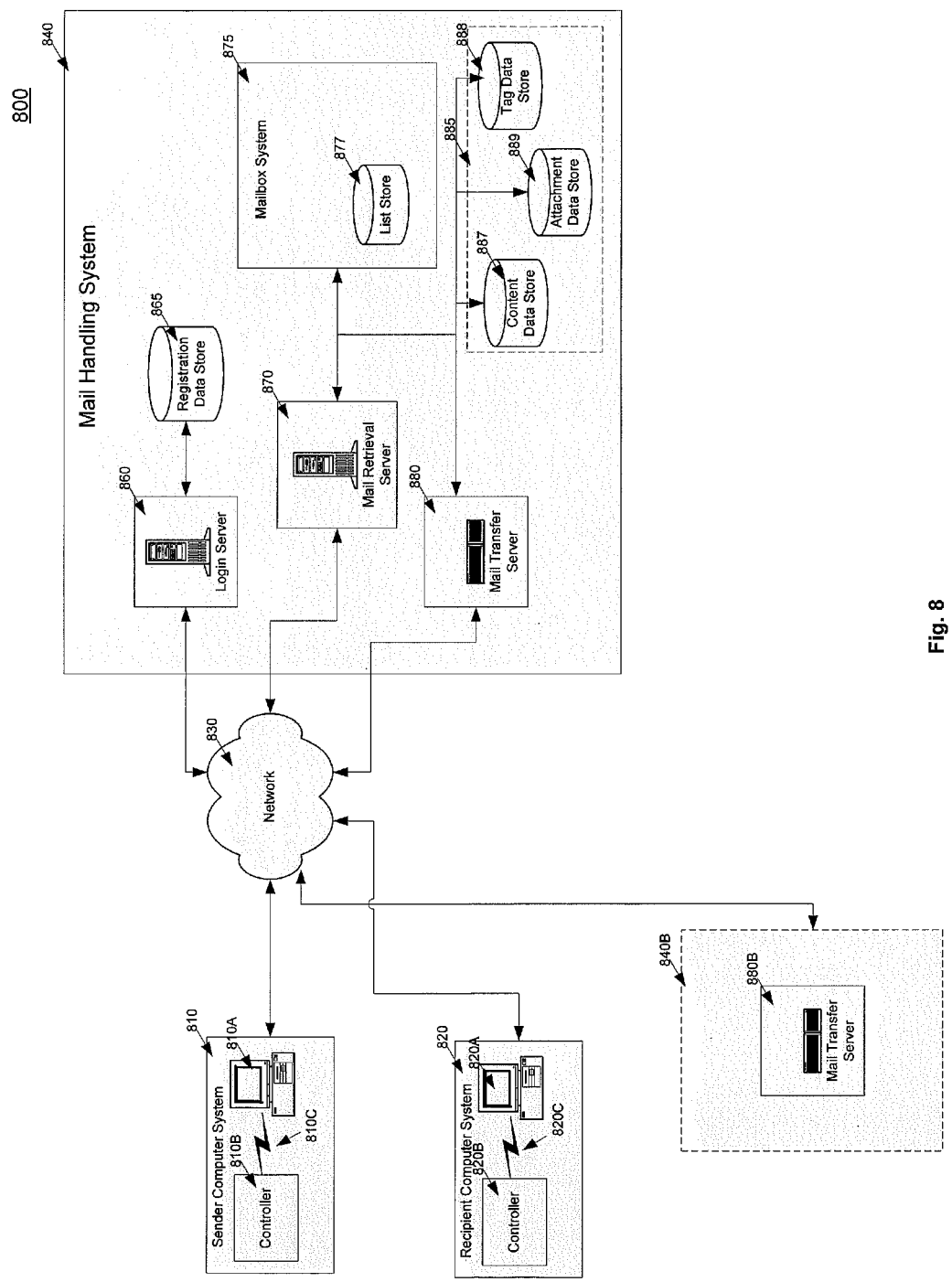
FIG. 8 is a block diagram illustrating a communication system capable of generating, delivering, and storing tagged e-mails.

Referring to FIG. 8, a communications system 800 capable of generating, delivering, and storing annotated or tagged e-mails includes a sender computer system 810, a recipient computer system 820, a network 830, a mail handling system 840, and, optionally, a second mail handling system 840b. Communications system 800 is an exemplary system that may be used to implement processes 100, 400, and 600. While communications system 800 is described as handling e-mails, a similar or analogous system may be applied to any electronic messages that are sent by users to recipient users to communicate with the recipient users and that are capable of being stored by the recipient users for subsequent access. For example, the system 800 may be applied to voicemails in addition to or as an alternative to e-mails by the inclusion voice capabilities in the sender computer system 810 and in the recipient computer system 820 and by including a voice gateway and, optionally, one or more authentication and audio playback servers in the mail handling system 840. Moreover, communications system 800 is shown to include only a single sender computer system 810 and a single recipient computer system 820 for illustrative purposes. Communications system 800 may support and handle communications between multiple and typically a large number of different sender and recipient computer systems.

The sender computer system 810 is configured to send and receive e-mails and tag data from the mail handling system 840 in the form of one or more digital communications. The sender computer system includes a device 810A capable of executing instructions under the command of a controller 810B. The device 810A may be a general purpose computer, such as a workstation or a personal computer, a PDA, a special purpose computer (such as a BlackBerry), an intelligent mobile phone, a pager, or a set top box.

The controller 810B commands and directs communications between the device 810A of the sender computer system 810 and the mail handling system 840. The controller 810B may include one or more software or hardware applications that enable digital communications to be received from the mail handling system 840. For example, the controller 810B may be an e-mail application configured to send, receive or otherwise access e-mails and tag data from the mail handling system 840, and/or a web browser application configured to send, receive or otherwise access e-mails and tag data from the mail handling system 840. The device 810A is connected to the controller 810B by a wired, wireless or virtual (i.e., when the controller is software running on the device) data pathway 810C capable of delivering data.

The recipient computer system 820 is configured to send and receive e-mails and tag data from the mail handling system 840. The recipient computer system 820 includes a device 820A capable of executing instructions under the command of a controller 820B. The recipient computer system 820, the device 820A and the controller 820B may have the same structure and functionality as described previously with respect to the sender computer system 810, the device 810A, and the controller 810B, respectively.

The network 830 is configured to enable direct or indirect communications between the sender computer system 810, recipient computer system 820 and the mail handling system 840. Examples of the network 830 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data.

The mail handling system 840 includes a login server 860 that accesses a registration data store 865, a mail retrieval server 870, a mailbox system 875, the mail transfer server 880, and a mail data store 885. The mailbox system 875 includes a list store 877. The mail data store 885 includes a contents data store 887, a tags data store 888, and an attachment data store 889. For ease of exposition, the mail handling system 840 is described as having single monolithic components 860, 865, 870, 875, 880 and 885. However, more or less computers, data stores, and/or processors than that shown in FIG. 8 may perform the functions of these various components.

The login server 860 verifies the identity of a user of the recipient system 820 prior to allowing the user to access the mail services offered by the mail system 840. To do so, the login server 860 accesses the registration data store 865 to determine whether a given user attempting to access mail services has, in fact, been registered for such services. The login server 860 prevents users that have not been registered for mail services from accessing the mail services provided by the mail system 840.

The mail retrieval server 870 is configured to retrieve mail and tag data stored in the mail data store 885. The mail retrieval server 870 communicates with the recipient computer system 820 directly using a protocol for retrieving mail such as, for example, Internet Message Access Protocol (IMAP) or Post Office Protocol (POP). The mail retrieval server 870 also may receive from the mailbox system 875 a list of the mail stored in the mail data store 885 that is available for retrieval.

The mailbox system 875 keeps track of information about the mail stored in the electronic mailbox of each registered user (i.e., the storage area in which the mail of each user is stored). The mailbox system stores this information in the list store 877. The list store 877 is a data store that may include a data entry for each piece of mail in the mailbox of each user. The data entry for each piece of mail may include the header information of the piece of mail, the type of mail, the folder/tab in which the mail has been placed, the mail status information (e.g., message opened or not opened, message forwarded, and message replied to and the corresponding date/time when these actions were performed), and mail data storage pointer information. The mail data storage pointer information may include one or more pointers to the locations in the mail data store 885 in which the contents and attachments of the piece of mail are stored. The list store 877 also may store other information related to the mailbox of each user, such as, for example, the size and remaining capacity of the mailbox. In some implementations, the list store 877 stores the tags for each piece of mail in the data entry or stores pointer information to the corresponding tag data in the tag data store 888 for each piece of mail.

The mail transfer server 880 provides the sender computer system 810 and the recipient computer system 820 with the ability to receive mail and tag data from other users and send mail and tag data to other users. The mail transfer server 880 communicates with the recipient computer system 834 using a protocol for transferring mail such as, for example, SMTP.

The mail transfer server 880 receives mail and tag data sent by the sender computer system 810 and by the recipient computer system 820. If the recipient of a piece of mail sent by the sender computer system 810 or by the recipient computer system 820 is registered for mail services with the mail handling system 840 (i.e., the piece of mail is addressed to a mailbox in the mail box system 875), the mail transfer server 880 may store the piece of mail in the mailbox of the recipient. If the recipient of a piece of mail is not registered for mail services with the mail handling system 840 but is receiving mail services from a second and different mail handling system 840B in communication with the mail handling system 840 through the network 830, the mail transfer server 880 may send the piece of mail (and optionally the tag data) to the mail transfer server 880B or a comparable component in the second mail handling system 840B associated with the recipient.

The mail transfer server 880 also may receive mail and tag data from mail transfer servers 880B of other mail systems 820B. The mail transfer server 880 may store mail and tag data that is addressed to a recipient that receives mail services from the mail system 840 in the mailbox of the recipient. The mail transfer servers may be, for example, SMTP gateways.

The mail data store 885 stores mail data including the contents, attachments, and tags of mail received by users registered to receive mail services provided by the mail system 840. The mail data store 885 includes a content data store 887, a tag data store 888, and an attachments data store 889. The mail data store 885 sends mail data and tag data to the mail retrieval server 870, receives mail data and tag data for storage from the mail transfer server 880, and receives updated tag data for storage from the mail retrieval server 880. The mail data, which typically is compressed when stored, is typically decompressed by the mail data store 885 or the mail retrieval server 870 upon being retrieved. The mail data store 885 also may provide the mailbox system 875 and/or the mail transfer server 880 with mail data storage pointer information. The tag data store 888 may store user data records that store assigned and proposed tags for the various e-mails received by a user, tag update information, tag generation rules, tag acceptance rules, tag update rules, and send tags rules.

A user of the sender computer system 810 or the recipient computer system 820 typically is registered prior to accessing the mail services provided by the mail handling system 840. The registration process includes generating a configuration file for the user. The configuration file includes the user identifier assigned to the user. The configuration file also may include a password that is provided by the user each time the user wants to access the mail services provided by the mail handling system 840. The user configuration files may be stored in the registration data store 865.

When a user wants to access the mail services provided by the mail system 840, the user may launch or execute a mail application that communicates with the login server 860. The user may log into the mail system 820 by providing his or her user identifier and his or her password. The login server 860 verifies that the user identifier and associated password correspond to a user identifier and associated password stored in the registration data store and registered to receive mail services.

Figure 9:
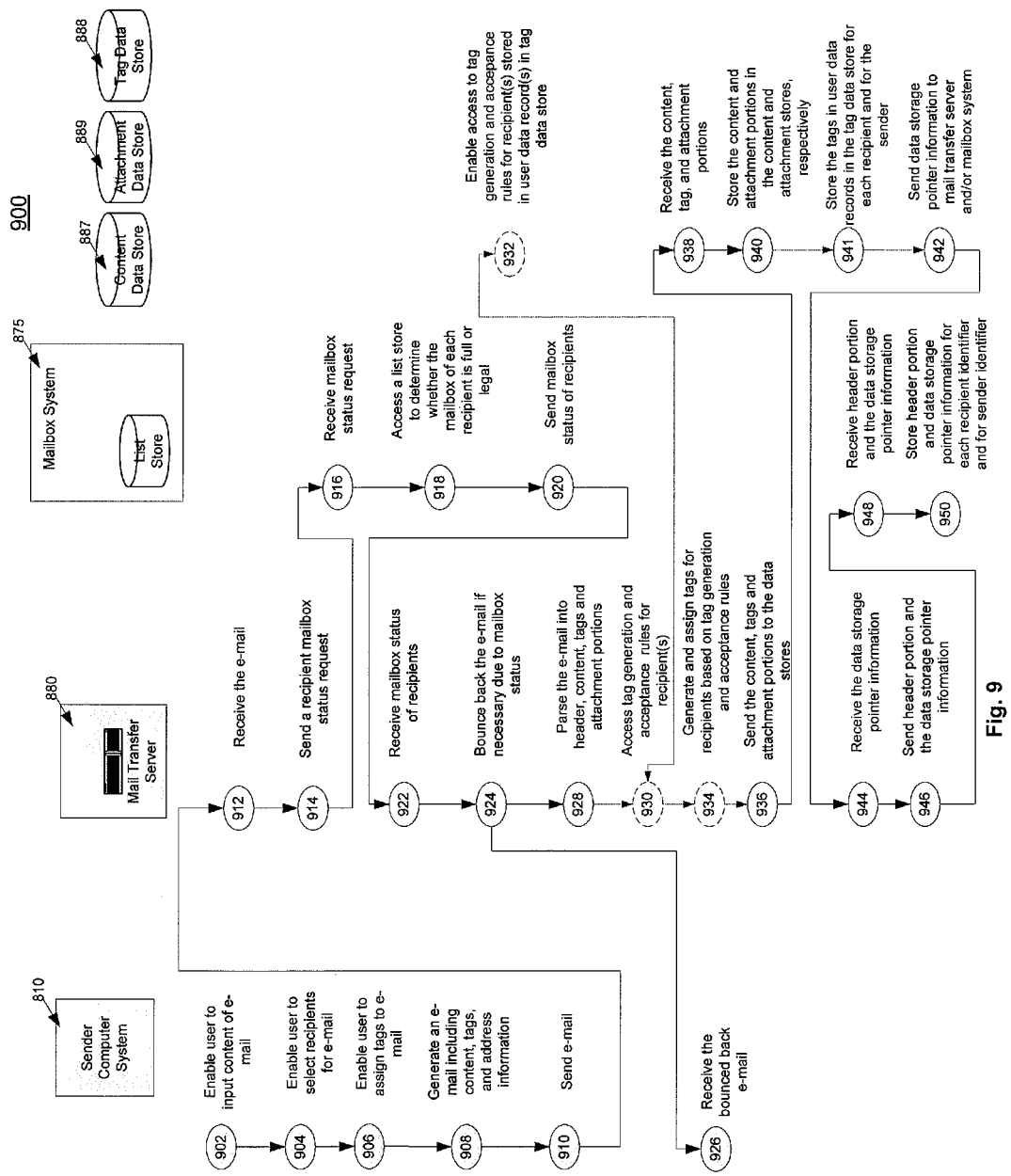
FIG. 9 is a flow chart illustrating a process for generating, delivering, and storing tagged e-mails.

FIG. 9 shows a process 900 for generating, delivering, and storing tagged or annotated e-mails. For convenience, particular components described with respect to FIG. 8 are referenced as performing the process 900. However, similar methodologies may be applied in other implementations where different components are used to define the structure of the system, or where the functionality is distributed differently among the components shown by FIG. 8. Process 900 is an implementation example of process 400 of FIG. 4.

After launching a mail application and logging into the mail handling system 840, a user of the sender computer system 810 inputs the textual contents of an e-mail (902), selects recipients for the e-mail (904) and assigns tags to the e-mail (906). In one implementation, the user may interact with interface 570 of FIG. 5B or interface 550 of FIG. 5A to input the textual contents of an e-mail, select recipients, and assign tags to the e-mail. In another implementation, the user interacts with an interface 550 or 570 that does not include a tag assignment interface 556 or 576. Instead, the sender computer system 810 accesses tag generation rules stored locally or at the tag data store 888 and automatically assigns tags to the e-mail in accordance with the tag generation rules. The sender computer system 810 generates an e-mail including content, tags and recipient address information (908) and sends the e-mail with the assigned tags to the mail transfer server 880 (910).

The mail transfer server 880 receives the e-mail with the assigned tags from the sender computer system 810 (912). The mail transfer server 880 sends a status request to the mailbox system 875 to determine the status of the mailbox of each recipient of the e-mail (914). For simplicity, the process 900 assumes that all e-mail recipients have mailboxes in the mail handling system 840. In other implementations, the mail transfer server 880 may need to deliver the email with proposed tags to other mail transfer servers 880B of other mail handling systems 840B if any of the recipients of the email have mailboxes in other mail systems. If the other mail handling systems 840B do not support e-mail tagging, the mail transfer server 880 may not send the proposed tags with the e-mail.

The mailbox system 875 receives the mailbox status request from the mail transfer server 880 (916) and accesses the list store 877 to determine whether the mailbox of the recipient is full or legal (918). The mailbox system 875 returns the mailbox status of the recipient to the mail transfer server 880 (920).

The mail transfer server 880 receives the status of the mailbox of the recipient (922) and, when appropriate based on the mailbox status, bounces back (i.e., returns to the sender) the e-mail (924). For example, if the mailbox of the recipient is full or if the mailbox of the recipient is no longer legal (e.g., the mailbox has been frozen because of the behavior of the recipient), the e-mail is bounced back. When the mail transfer server 880 bounces back an e-mail, the mail transfer server 680 typically changes the recipient address to that of the sender, optionally adds information regarding the reason why the e-mail is being bounced back, and handles the e-mail like any other piece of mail that is sent to a client system (926).

If the mailbox of the recipient is legal and is not full, the mail transfer server 880 parses the e-mail into a header section, a contents section, tags, and an attachment section (928). Optionally, the mail transfer server 880 may access tag acceptance and generation rules for the recipient(s) (930) from the tag data store 888 (932) and may generate and assign new tags and/or assign the received proposed tags as recipient tags for the mail based on the tag acceptance and generation rules (934). The mail transfer server 880 then sends the contents section, tags (proposed and assigned tags), and attachment section of the e-mail to the mail data store 685 (936).

The mail data store 885 receives the contents section, tags, and attachment sections of the e-mail (938) and stores the content and attachment sections in the content data store 887 and the attachment data store 889, respectively (940). The mail data store 885 stores the e-mail tags for the sender and for each recipient in their own respective user data records (941). In particular, the mail data store 885 may store the received tags as assigned sender tags for the e-mail in a user data record for the sender. The mail data store 885 may store the received tags as either proposed or assigned sender tags for the e-mail in the data records for the recipients based on the global or recipient-specific tag acceptance rules. The mail data store 885 may store any new tags that were generated by the global or recipient-specific tag generation rules as assigned recipient tags for the e-mail in the data records for the recipients. The mail data store 885 sends data storage pointer information for the content and attachment sections of the e-mail or otherwise makes the data storage pointer information accessible to the mail transfer server 880 and/or to the mailbox system 875 (942).

The mail transfer server 880 receives or otherwise accesses the data storage pointer information from the mail data store 885 (944) and sends the header portion of the email and the data storage pointer information to the mailbox system 875 (946).

The mailbox system 875 receives the header portion from the mail transfer server 880 and receives the data storage pointer information from the mail transfer server 880 and/or from the mail data store 885 (948). The mailbox system 875 stores the header portion and the data storage pointer information in the list store 877 in a mail data entry corresponding to the mailbox of the recipient (950).

Figure 10:
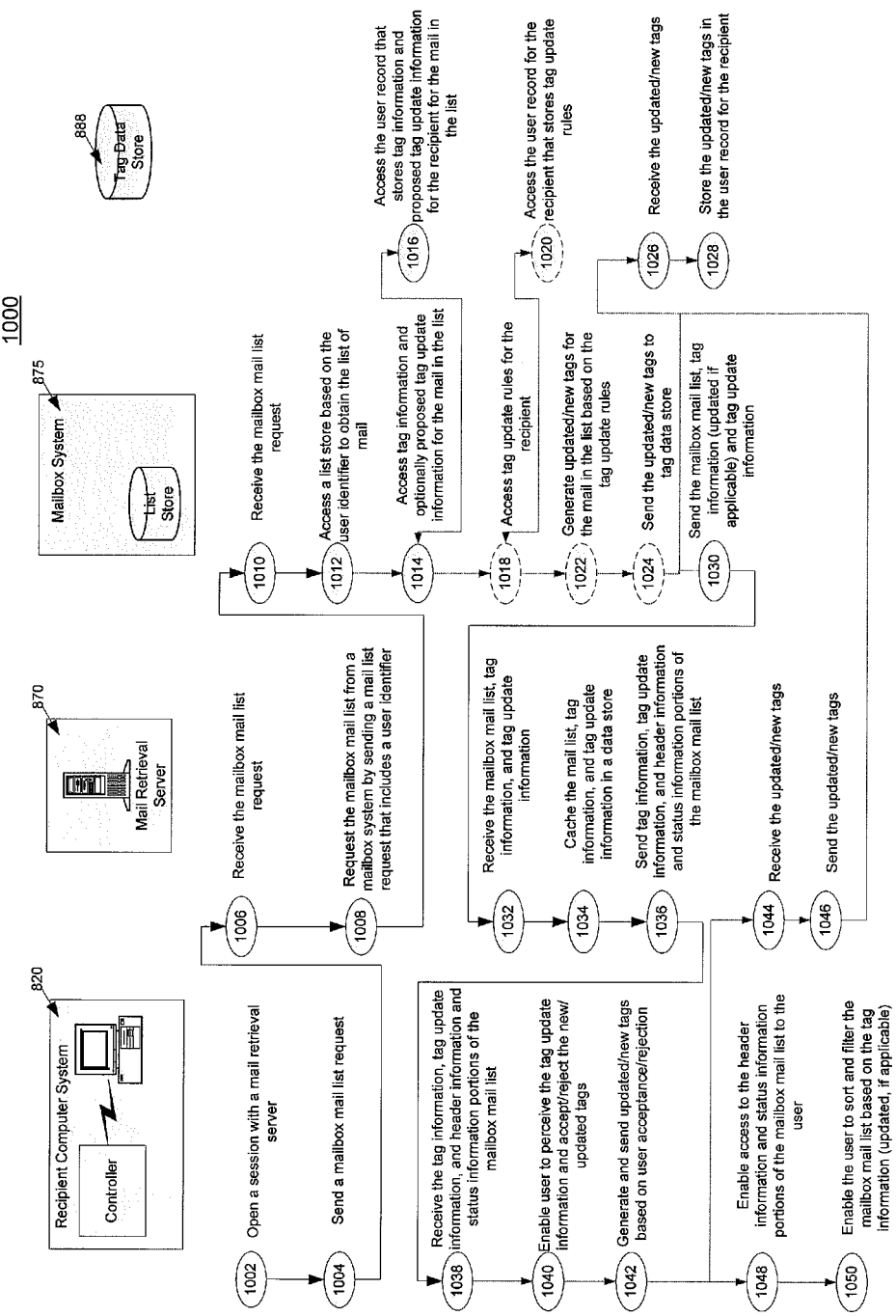
FIG. 10 is a flow chart illustrating a process for enabling users to perceive a list of stored e-mails and search the list for e-mails associated with particular tags.

FIG. 10 illustrates a process 1000 that enable users of the sender and recipient systems to perceive a list of emails stored in a mail handling system and search the list of e-mails for e-mails associated with particular tags. For convenience particular components described with respect to FIG. 8 are described as implementing the process shown in FIG. 10. However, similar methodologies may be applied in other implementations where different components are used to define the structure of the system, or where the functionality is distributed differently among the components shown by FIG. 8. Process 1000 is an implementation example of operations 110, 125, 130 and 140 of process 100 of FIG. 1 and operation 615 of FIG. 6.

After launching a mail application and logging into the mail handling system 840, the recipient computer system 820 opens a session with the mail retrieval server 870 (1002) and sends a mailbox mail list request to the mail retrieval server 870 (1004). The mailbox mail list request may include the user identifier of the user of the recipient system 820 and may include an identifier for the list or folder that is being requested by the user (e.g., the new mail list or folder). By default, the list identifier may correspond to the new mail list when the user first opens a session with the mail retrieval server 870.

The mail retrieval server 870 receives the mailbox mail list request from the recipient computer system 820 (1006) and requests the mailbox mail list from the mailbox system 875 (1008). The mail retrieval server 870 may receive an identifier of the user of the recipient system 820 from either the login server 860 or from the recipient computer system 820.

The mailbox system 875 receives the mailbox mail list request from the mail retrieval server 870 (1010), accesses the list store 877 to obtain the mailbox mail list that corresponds to the user identifier (and to the requested list/folder identifier) (1012). The mailbox system 875 also may access the tag information (corresponding to assigned and/or proposed tags) and tag update information (corresponding to proposed new and/or proposed updated tags for pieces of mail that have already been tagged by the user) for the mail in the list from the corresponding user data record in the tag data store 888 (1014 and 1016). The mailbox system 875 may optionally access tag update rules from the user record for the recipient in the tag data store 888 (1018 and 1020) and may determine which, if any, of the proposed updated/new tags for the previously tagged mail should be automatically assigned to the previously tagged mail based on the tag update rules (1022).

In some implementations, the mailbox system 875 may automatically assign the proposed updated/new tags to the previously tagged mail by sending the updated/new tags to the tag data store 888 for storage in the recipient's user record as assigned tags (1024, 1026 and 1028). In these implementations, operations 1040 and 1042, which are directed to enabling the user to view and accept proposed updated/new tags for assignment to previously tagged mail may not be performed because the acceptance and assignment of the proposed updated/new tags for the mail occurred automatically without the need for user interaction. In some implementations, operations 1024, 1026 and 1028 are performed for automatically assigning proposed new/updated tags for some of the previously tagged mail in the list while operations 1040 and 1042 are performed for prompting the user to accept assignment of proposed new/updated tags for other previously tagged mail in the list.

The mailbox system 875 sends the mailbox mail list, tag information (updated, if applicable), and tag update information (if available) to the mail retrieval server 870 (1030). If the tag update rules have already accepted and assigned the proposed updated/new tags for all the mail in the list, the mailbox system 875 may not send the tag update information to the mail retrieval server 870 as the update of the tags has already been implemented.

The mailbox mail list includes some or all of the data entries corresponding to mail stored in the mailbox of the user. The data entries for each piece of mail include header information (including mail type), status information, and data storage pointer information. The tag information includes the proposed and assigned tags for the mail in the list. The proposed and/or assigned tags may have been received from the sender of the e-mail, the recipient, and/or other recipients. The tag update information sent to the mail retrieval server 870 may include proposed new and/or updated tags received from the sender and/or from other recipients for already tagged e-mails that were not automatically assigned through application of the tag update rules.

The mail retrieval server 870 receives the mailbox mail list, tag information, and tag update information (if available) from the mailbox system 875 (1032) and caches the mailbox mail list, tag information, and tag update information (1034). The mail retrieval server 870 sends or otherwise makes the header information, the status information, tag information, and tag update information of the data entries of the mailbox mail list accessible to the recipient computer system 820 (1036).

The recipient computer system 820 receives the tag information, tag update information (if available), header information and the status information of the data entries in the mailbox mail list from the mail retrieval server 870 (1038). If no tag update information is received (due to, for example, no tag updates of previously tagged pieces of mail being sent by other users or due to application of the tag update rules handling all updates to the mail automatically), process 1000 proceeds to operation 1048. If tag update information is received, the recipient computer system 820 enables the recipient user to perceive the tag update information and accept/reject the new/updated tags (1040). The recipient computer system 820 sends the updated/new tags to the mail retrieval server 870 (1042), which receives (1044) and sends the updated/new tags to the tag data store 888 (1046) for storage as assigned tags in a data record for the recipient (1026 and 1028). In some implementations, the recipient computer system 820 may present interface 700 of FIG. 7 to enable the recipient to perceive the tag update information and accept/reject the new/updated tags.

The recipient computer system 820 may enable the user to access the header and status information of the data entries in the mailbox mail list (1048). The mail application of the recipient computer system 820 may, for example, allow the user to access the header and status information of the mailbox mail list by displaying the information in a list on a computer screen (e.g., list 202 of FIG. 2A or list 302 of FIG. 3A). The user of the recipient computer system 820 may thus perceive the list of e-mails by simply viewing the computer screen. The user may open a received piece of mail by simply selecting the data entry corresponding to the received piece of mail from the perceived list.

The recipient computer system 820 may enable the user to sort and filter the mailbox mail list based on the tag data (1050). For example, the user may interact with interface 300 of FIG. 3A to submit a keyword search query, initiate a search, and perceive a filtered mail list (e.g., like that shown in FIG. 3B). In some implementations, the user may interact with an additional "Tag" column displayed in the mail list interface to sort and filter the tags as described previously. In some implementations, the user may choose to sort and/or filter based on only tags that have been assigned to the mail, only tags that have been proposed for assignment to the mail, and/or on all tags, whether assigned or only proposed for assignment, to the mail. The user may choose to sort and/or filter only based on sender tags (proposed and/or assigned), the user's own tags, and/or other recipient tags (proposed and/or assigned).

Figure 11:
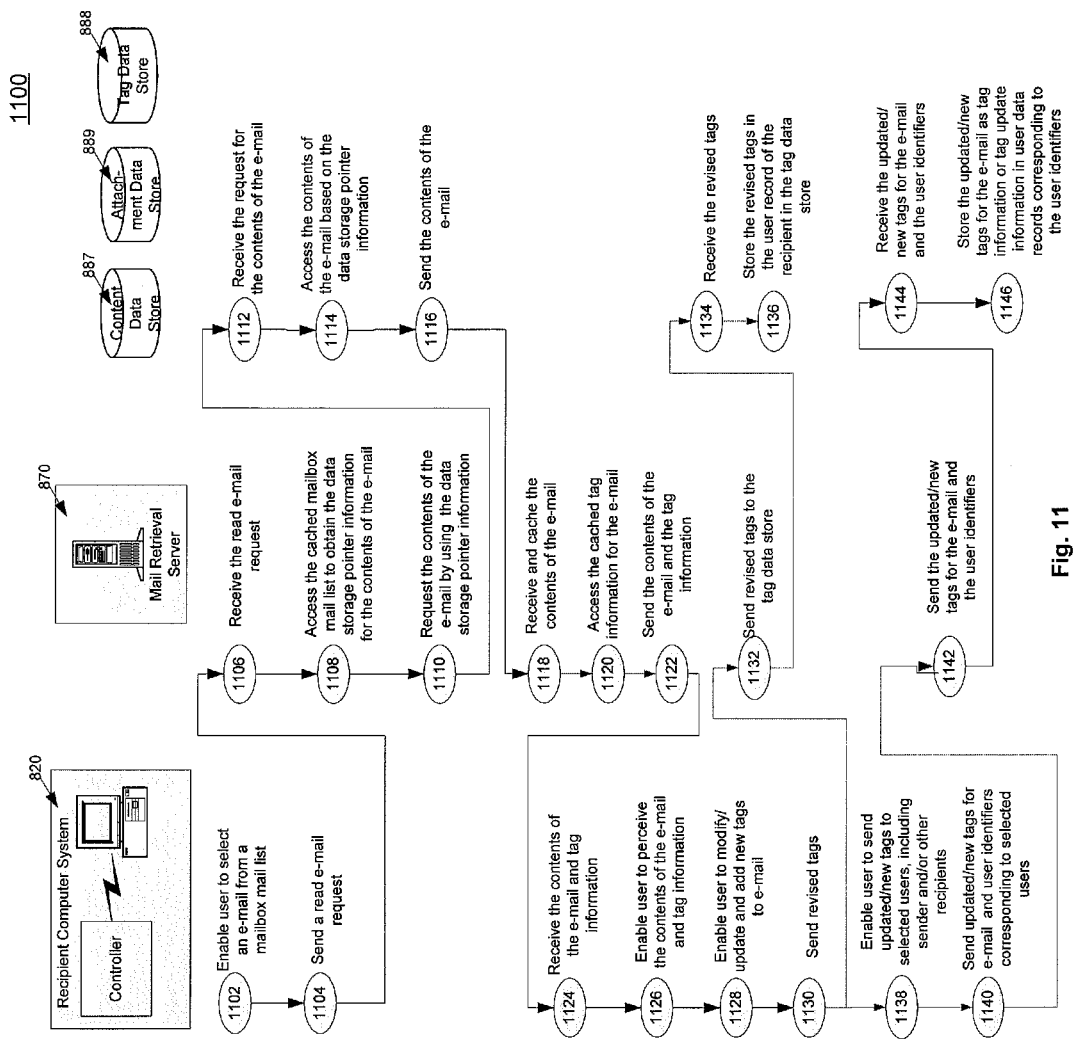
FIG. 11 is a flow chart illustrating a process for enabling a user to access an e-mail and modify tags associated with the e-mail.

FIG. 11 shows a process 1100 for enabling a user to access an e-mail having proposed and/or assigned tags and modify or update the tags assigned to the e-mail. For convenience particular components described with respect to FIG. 8 are described as implementing the process shown in FIG. 11. However, similar methodologies may be applied in other implementations where different components are used to define the structure of the system, or where the functionality is distributed differently among the components shown by FIG. 8. Process 1100 is an implementation example of operations 105, 110, 115 and 120 of process 100 of FIG. 1 and operations 610 and 615 of FIG. 6.

A recipient uses the recipient computer system 820 to select a data entry corresponding to an e-mail having proposed and/or assigned tags from the mailbox mail list (1102). In one implementation example, the user selects a data entry 208 from the list 202 of the user interface 200 of FIG. 2A. The recipient computer system 820 sends a read e-mail request to the mail retrieval server 870 (1104).

The mail retrieval server 670 receives the read e-mail request (1106), accesses the cached mailbox mail list to obtain the data storage pointer information for the content of the e-mail (1108), and requests the contents of the email from the content data store 887 using the data storage pointer information (1110). The content data store 687 receives the request from the mail retrieval server 570 (1112), accesses the contents of the e-mail based on the data storage pointer information (1114), and sends the contents of the e-mail to the mail retrieval server 870 (1116).

The mail retrieval server 870 receives and caches the contents of the e-mail (1118) and accesses the cached tag information for the requested e-mail (1120). The mail retrieval server 870 sends the contents of the e-mail and the tag information for the e-mail to the recipient computer system 820 (1122).

The recipient computer system 820 receives the contents of the e-mail and tag information from the mail retrieval server 870 (1124) and enables the user to perceive the contents of the e-mail and tag information (1126). In one implementation example, the recipient computer system 820 presents the interface 216 of FIG. 2B to the user to display the contents and tag information of the e-mail.

The recipient computer system 820 enables the user to change the tags assigned to the e-mail by, for example, assigning proposed tags to the e-mail, unassigning previously assigned tags, assigning an updated tag that corresponds to an update of a proposed tag, assigning an updated tag that corresponds to an update of an assigned tag, and/or assigning a new tag to the e-mail (1128). In one implementation example, the recipient computer 820 enables the user to change the tags assigned to the e-mail by interacting with tag assignment section 222 of interface 216. The recipient computer system 820 sends the revised tags to the mail retrieval server 870 (1130), which sends the revised tags to the tag data store 888 (1132) for storage in the user record corresponding to the user (1134 and 1136).

The recipient computer system 820 enables the user to choose to send any updated/new tags to selected users, including the sender and/or other recipients of the e-mail (1138). In one implementation example, the recipient computer 820 presents the interface 240 of FIG. 2C to enable the user to choose whether to send the updated/new tags to selected users. The recipient computer system 820 sends the updated/new tags for the e-mail and user identifiers corresponding to the selected users to the mail retrieval server 870 (1140), which sends the revised tags to the tag data store 888 (1142) for storage in the user records corresponding to the user identifiers (1142 and 1144).

The tag data store 888 may store the revised tags in a particular user's data record as either tag update information or as tag information for the e-mail depending on whether the particular user has already opened and/or tagged the e-mail. If the particular user has already opened and/or tagged the e-mail, the revised tags may be stored as tag update information that will be subsequently processed (i.e., assigned or not assigned to the e-mail) in accordance with tag update rules and/or manual interaction with an interface like interface 700 of FIG. 7. If the particular user has not yet opened and/or tagged the e-mail, the revised tags may be stored as tag information that will subsequently processed in accordance with tag acceptance rules and/or manual interaction with an interface like interface 216 of FIG. 2B.

FIG. 12 shows an exemplary mail system user interface 1200 that may be used by a recipient to perceive e-mails and voicemails using a recipient electronic device. The interface 1200 may be implemented using, for example, a client software module on a recipient electronic device or using a server software module in a server or host system. In some implementations, the interface 1200 may be perceivable by a user through a web browser interface. In some implementations, the interface 1200 may be combined with one or more of interfaces 200, 216, 240, 550, 570 and 700 into a single interface.

The interface 1200 is similar to interface 200 of FIG. 2A except that the mail is not organized using graphical tabs but rather is organized in a folder hierarchy 1202 that is displayed to the user. The user may access mail in any folder by selecting one of the folders displayed in the graphical folder hierarchy 1202. In the illustrated example, the user has selected the new mail folder 1204 (as indicated by the displayed selection box 1206), resulting in a mail display 1208 displaying the mail that was placed in the new mail folder 1204. The user may interact with the mail shown in the mail display 1208 in a manner similar to that described above with respect to FIG. 2A.

Other folders included in the mail hierarchy also may be selected by the user to view their corresponding mail in the mail display 1208. In the illustrated example, the other folders include a "Team A" folder 1210, a "Team B" folder 1212 (which has two subfolders —"Milestones" 1214 and "Test Results" 1216), a Misc Filing Cabinet folder 1218, and a sent mail folder 1220. A user may place mail into the different folders by interacting with various interface elements such as drop-down menus, toolbars, and pop-up menus to select and then assign a piece of mail manually to a folder. A user also may manually place mail into the different folders by dragging a piece of mail from display 1208 and dropping it into one of the folders displayed in the folder hierarchy.

The user also may setup an automatic process to automatically populate one or more of the folders in the folder hierarchy 1202 by assigning a tag search query to each of the different folders. A tag search query for a folder may be run automatically, for example, upon the user initiating a session with the mail communications program to populate the corresponding folder by applying the search query to the new mail folder (or to another user-specified folder) and placing mail that satisfies the search query into the corresponding folder. In another implementation, rather than automatically populating the folders upon the user initiating the session, the user may automatically populate one or more of the folders in response to a manual selection by the user of an option to apply the corresponding folder query or queries to the new mail (or to another user-specified folder).

The tag search query for a folder is similar to that described previously with respect to FIGS. 3A and 3B. As stated previously, the tag search query may be run on only assigned tags, on only proposed tags, or on any tag, whether assigned or proposed, as specified by or for the user. The tag search query may be run on only sender tags, on only recipient tags, on only other recipient tags, or on any combination of these tags as specified by or for the user.

For example, the Team A folder 1210 may be associated with a search query "Team A and ultrasound project" to be applied to both proposed tags and assigned tags. Upon the user initiating a session with the mail communications program, the search query "Team A and ultrasound project" may be automatically run on the new mail in the new mail folder 1204 and any mail that has been tagged with the tags "Team A" and "ultrasound project" (whether proposed or already assigned) may be automatically moved from the new mail folder 1204 to the Team A folder 1210. In another implementation, rather than moving mail into the folder, the user may select an option to have a copy of the mail that satisfies the search query be automatically placed in the folder that has been assigned the search query. In this manner, the user may leverage interface 1200 to setup a group of folders, associate tag search queries with the folders, and thereby automatically organize their mail such that the user is better able to navigate through the mail to find mail of interest.

A number of implementations have been described. Nevertheless, it will be understood that various modifications may be made. For example, some operations in the disclosed processes may occur simultaneously or in a different order than that previously described.

What is claimed is:

1. A method for enabling recipients to share tags that they associate with received e-mails, the method comprising the following operations performed by at least one processor:
receiving an e-mail from a sending user addressed to a receiving user, the e-mail including a header and a body and being capable of supporting attachments to the e-mail that are distinct of the body;
enabling the receiving user to associate at least one tag with the e-mail, the at least one tag being a textual descriptor for the received e-mail distinct from the header, body, and attachments of the received e-mail;
storing the received e-mail and the at least one tag in a data store associated with the receiving user;
enabling the receiving user to select a subset of other users to receive the at least one tag, wherein the other users comprise one or more of the sending user and other recipients of the e-mail to whom the sending user sent the e-mail; and
propagating the at least one tag to the selected subset of other users, wherein the propagation occurs without a user response to the received e-mail and becomes viewable upon propagation to the selected subset of other users.

2. The method of claim 1, wherein enabling the receiving user to associate the at least one tag with the e-mail comprises enabling the receiving user to assign the at least one tag to the e-mail for subsequent use as a basis for determining, in response to a search query submitted by the receiving user, a subset of stored e-mails that are addressed to the receiving user.

3. The method of claim 1, wherein propagating the at least one tag to the subset of other users comprises sending the at least one tag to the at least one of the sending user and the other recipient as a proposed tag such that the at least one of the sending user and the other recipient can select to assign the proposed tag to the e-mail for subsequent use as a basis for determining, in response to a search query submitted by the at least one of the sending user and the other recipient, a subset of stored e-mails that are sent by or addressed to the at least one of the sending user and the other recipient.

4. The method of claim 1, wherein propagating the at least one tag to the subset of other users comprises automatically sending the at least one tag as a proposed tag for the e-mail to at least one of the sending user and the other recipient in accordance with predetermined send tag rules.

5. The method of claim 4, wherein the predetermined send tag rules are specific to the receiving user.

6. The method of claim 5, wherein automatically sending the at least one tag as a proposed tag in accordance with the send tag rules comprises automatically sending the at least one tag conditioned on the at least one tag being a new tag created by the receiving user for the e-mail.

7. The method of claim 5, wherein automatically sending the at least one tag as a proposed tag in accordance with the send tag rules comprises automatically sending the at least one tag conditioned on the at least one tag being an update of an old tag previously received from and created by the sending user or the other recipient for the e-mail.

8. The method of claim 5, wherein automatically sending the at least one tag as a proposed tag in accordance with the send tag rules comprises automatically sending the at least one tag to at least one of the sending user and the other recipient conditioned on a subject matter of the e-mail in the header matching a particular subject matter predefined by the receiving user.

9. The method of claim 8, wherein the particular subject matter is selected by the receiving user.

10. The method of claim 5, wherein automatically sending the at least one tag as a proposed tag in accordance with the send tag rules comprises automatically sending the at least one tag to at least one of the sending user and the other recipient conditioned on the body of the e-mail including one or more terms that match one or more particular predetermined terms.

11. The method of claim 10, wherein the one or more particular predetermined terms are selected by the receiving user.

12. The method of claim 4, wherein automatically sending the at least one tag as a proposed tag for the e-mail in accordance with the send tag rules comprises automatically sending the at least one tag to the sending user and to all other recipients of the e-mail to whom the sender sent the e-mail.

13. The method of claim 4, wherein automatically sending the at least one tag as a proposed tag for the e-mail in accordance with the send tag rules comprises automatically sending the at least one tag to one or more users selected by the receiving user, the one or more users including at least one of the sending user and the other recipient.

14. The method of claim 1, wherein propagating the at least one tag to the subset of other users comprises enabling the receiving user to interact with a graphical user interface to manually select the subset of other users to receive the at least one tag as a proposed tag for the e-mail.

15. The method of claim 1, wherein enabling the receiving user to associate the at least one tag with the e-mail comprises automatically generating and assigning the at least one tag to the e-mail based on predetermined tag generation rules specified by or for the receiving user.

16. The method of claim 15, wherein generating and assigning the at least one tag to the e-mail based on the tag generation rules includes generating and assigning a particular tag to the e-mail conditioned on the sending user being a particular sender.

17. The method of claim 15, wherein generating and assigning the at least one tag to the e-mail based on the tag generation rules includes generating and assigning a particular tag to the e-mail conditioned on one of the recipients of the e-mail to whom the sending user sent the e-mail being a particular recipient.

18. The method of claim 15, wherein generating and assigning the at least one tag to the e-mail based on the tag generation rules includes generating and assigning a particular updated tag corresponding to an update of a particular proposed tag to the e-mail conditioned on the sending user or the other recipient sending the particular proposed tag to the receiving user.

19. The method of claim 15, wherein generating and assigning the at least one tag to the e-mail based on the tag generation rules includes generating and assigning a particular tag to the e-mail conditioned on a subject matter of the e-mail in the header matching a particular subject matter.

20. The method of claim 19, wherein the particular subject matter is selected by the receiving user.

21. A method for enabling a user to identify and then access a subset of received e-mails, the method comprising the following operations performed by at least one processor:
receiving an e-mail from a sending user addressed to a receiving user, the e-mail including a header having a subject line inputted by the sending user and a body having message contents inputted by the sending user, the e-mail being capable of supporting attachments to the e-mail that are distinct of the body;
subsequent to the receiving user receiving the e-mail from the sending user, receiving a proposed tag associated with the e-mail from another user by a direct communication separate from the e-mail or a reply to the e-mail, the proposed tag being designated by the another user to a subset of users associated with the e-mail and being a textual descriptor of the message contents of the e-mail and the textual descriptor also being distinct of the subject line, message contents, and attachments of the e-mail;
enabling the receiving user to select an option to store the proposed tag and assign the proposed tag to the e-mail for subsequent use as a basis for identifying, in response to a search query submitted by the receiving user, a subset of stored e-mails that are addressed to the receiving user.

22. The method of claim 21, wherein assigning the proposed tag to the e-mail comprises enabling the receiving user to perceive the proposed tag in a graphical user interface and to manually interact with the graphical user interface to select an option to assign the proposed tag to the e-mail.

23. The method of claim 21, wherein assigning the proposed tag to the e-mail comprises automatically assigning the proposed tag to the e-mail based on predetermined tag acceptance rules.

24. The method of claim 23, wherein the predetermined tag acceptance rules are specific to the receiving user.

25. A method for enabling a user to access e-mails, the method comprising the following operations performed by at least one processor:
receiving e-mails from e-mail senders, each of the e-mails being addressed to a receiving user, including a header and a body, and being capable of supporting attachments to the e-mail that are distinct of the body;
enabling the receiving user to associate at least one tag with each of the e-mails and select a subset of other users to receive the at least one tag, wherein the other users comprise the sending user and other recipients of the e-mail to whom the sending user sent the e-mail;
enabling the receiving user to accept a proposed tag associated with the e-mail from another user by a direct communication separate from the e-mail or a reply to the e-mail, the proposed tag being designated by the other user, the at least one tag and proposed tag being a textual descriptor for the e-mail that is distinct of the header, the body, and the attachments of the e-mail;
storing the e-mails and associated tags in a data store;

enabling the receiving user to input a textual boolean search query;

determining a subset of the e-mails by applying the textual boolean search query to the tags associated with the e-mails; and enabling the receiving user to perceive the subset of the e-mails.

* * * * *